(12) United States Patent
Yamauchi et al.

(10) Patent No.: US 11,204,324 B2
(45) Date of Patent: Dec. 21, 2021

(54) FLUORESCENCE MEASUREMENT DEVICE AND FLUORESCENCE MEASUREMENT METHOD

(71) Applicant: HAMAMATSU PHOTONICS K.K., Hamamatsu (JP)

(72) Inventors: Toyohiko Yamauchi, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/959,241

(22) PCT Filed: Oct. 30, 2018

(86) PCT No.: PCT/JP2018/040389
§ 371 (c)(1),
(2) Date: Jun. 30, 2020

(87) PCT Pub. No.: WO2019/135311
PCT Pub. Date: Jul. 11, 2019

(65) Prior Publication Data
US 2020/0333250 A1  Oct. 22, 2020

(30) Foreign Application Priority Data
Jan. 4, 2018 (JP) .............................. JP2018-000070

(51) Int. Cl.
*G01N 21/64* (2006.01)
*G01B 9/02* (2006.01)
*G01B 11/06* (2006.01)

(52) U.S. Cl.
CPC ..... *G01N 21/6456* (2013.01); *G01B 9/02041* (2013.01); *G01B 11/06* (2013.01);
(Continued)

(58) Field of Classification Search
CPC ....... G01N 21/6458; G01N 2021/6439; G01N 21/6428; G01B 11/06; G01B 9/02041
See application file for complete search history.

(56) References Cited

U.S. PATENT DOCUMENTS 10,042,150 B2 * 8/2018 Brown ................. G02B 21/365

FOREIGN PATENT DOCUMENTS

JP  2003-506711 A  2/2003
JP  2007-020422 A  2/2007
(Continued)

OTHER PUBLICATIONS

Lee, Benjamin R. et al., "A Digital Image Microscopy System for Rare-Event Detection Using Fluorescent Probes," Cytometry, 10, 1989, p. 256-p. 262.
(Continued)

*Primary Examiner* — David P Porta
*Assistant Examiner* — Fani Boosalis
(74) *Attorney, Agent, or Firm* — Faegre Drinker Biddle & Reath LLP

(57) ABSTRACT

A fluorescence measurement apparatus includes a fluorescence image acquisition unit that acquires a fluorescence image containing an object, an interference image acquisition unit that acquires an interference image containing the object, and an operation unit. The operation unit determines an optical thickness image based on the interference image acquired by the interference image acquisition unit, and determines, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

18 Claims, 26 Drawing Sheets

(52) U.S. Cl.
CPC ..... *G01N 21/6428* (2013.01); *G01N 21/6452* (2013.01); *G01N 2021/6439* (2013.01)

(56) References Cited

FOREIGN PATENT DOCUMENTS

| | | |
|---|---|---|
| JP | 2013-114042 A | 6/2013 |
| JP | 2014-035409 A | 2/2014 |
| JP | 2016-109579 A | 6/2016 |
| WO | WO-01/011340 A1 | 2/2001 |
| WO | WO-02/048693 A1 | 6/2002 |
| WO | WO-2016/121250 A1 | 8/2016 |

OTHER PUBLICATIONS

International Preliminary Report on Patentability dated Jul. 16, 2020 for PCT/JP2018/040389.

\* cited by examiner

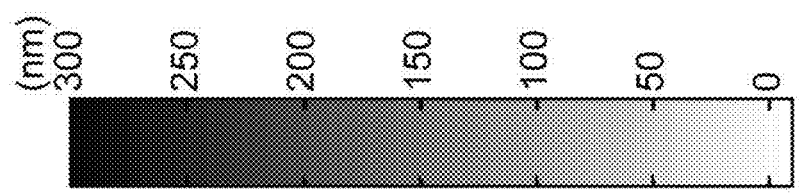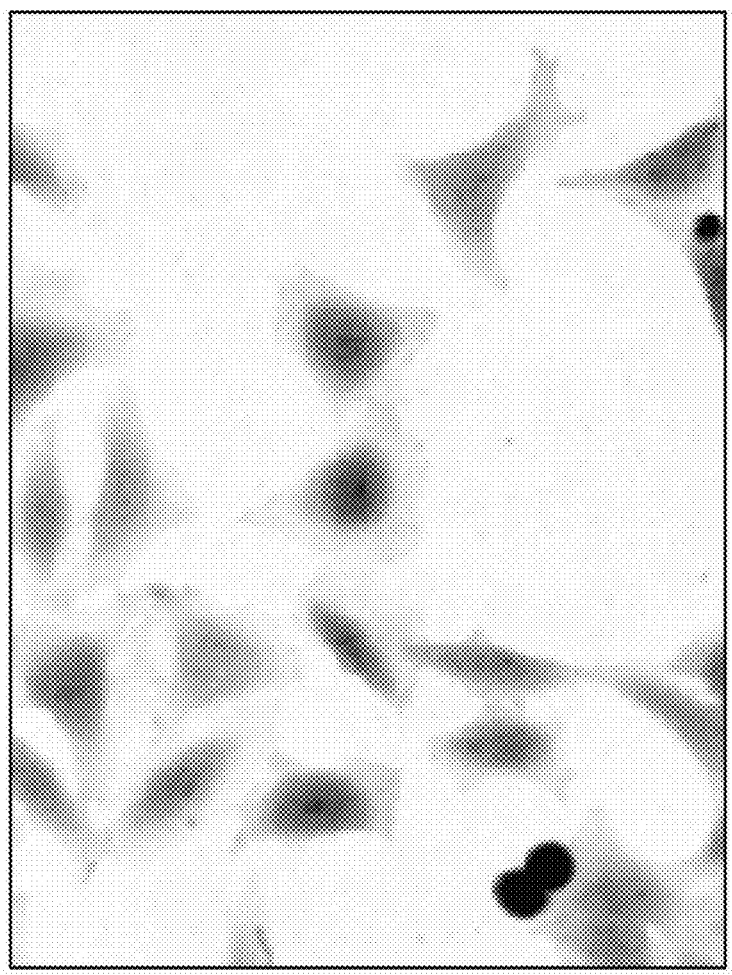
Fig.12

Fig.15

| cell# | area($\mu m^2$) | average OT | average FL | 1000*FL/OT |
|---:|---:|---:|---:|---:|
| 1 | 1081.1799 | 53.02665308 | 5.40739 | 101.9749444 |
| 2 | 1737.7902 | 52.95546307 | 1.887365 | 35.64060987 |
| 3 | 699.9858 | 49.19108261 | 0.541033 | 10.99859916 |
| 4 | 1303.0875 | 42.59535362 | 0.684028 | 16.05874683 |
| 5 | 2333.6019 | 50.08701552 | 4.993533 | 99.697156 |
| 6 | 1912.896 | 38.41569812 | 0.650724 | 16.93901274 |
| 7 | 1967.4252 | 40.28477001 | 0.535016 | 13.2808503 |
| 8 | 2302.4007 | 34.64910342 | 0.726752 | 20.97462642 |
| 9 | 580.5756 | 26.60989678 | 0.40545 | 15.2368122 |
| 10 | 1802.1609 | 70.32352675 | 7.472271 | 106.2556351 |
| 11 | 1380.2157 | 53.51336879 | 0.978767 | 18.29013987 |
| 12 | 2222.6481 | 60.17790643 | 2.808947 | 46.6773799 |
| 13 | 2490.7014 | 52.93461576 | 7.330153 | 138.4756061 |
| 14 | 1255.9212 | 60.62017017 | 1.014627 | 16.73744889 |
| 15 | 2170.7433 | 53.55326694 | 4.939483 | 92.23495189 |
| 16 | 1304.3997 | 57.46107187 | 0.909406 | 15.82647122 |
| 17 | 762.8985 | 222.0437595 | 10.153273 | 45.72645059 |
| 18 | 604.4868 | 88.0135748 | 5.867101 | 66.66131916 |
| 19 | 1571.6511 | 62.53991897 | 4.367781 | 69.83988901 |
| 20 | 1469.8827 | 70.03224933 | 6.206814 | 88.62794012 |
| 21 | 1080.2322 | 61.55236653 | 2.113511 | 34.33679514 |
| 22 | 314.928 | 44.95841061 | 0.886343 | 19.71473164 |
| 23 | 352.836 | 98.18463802 | 15.793802 | 160.8581782 |
| 24 | 361.3653 | 45.31916513 | 1.532177 | 33.80858839 |
| 25 | 399.6378 | 109.2106498 | 6.152682 | 56.3377474 |
| 26 | 420.2685 | 64.6818441 | 2.060364 | 31.85382279 |

FLUORESCENCE MEASUREMENT DEVICE AND FLUORESCENCE MEASUREMENT METHOD

TECHNICAL FIELD

The present disclosure relates to a fluorescence measurement apparatus and a fluorescence measurement method.

BACKGROUND ART

There are known methods in which, in a fluorescence image of a cell population acquired by a fluorescence microscope, cells having a high fluorescence intensity and cells having a low fluorescence intensity are classified for statistical analysis. For example, in a technique described in Non Patent Document 1, a fluorescence image containing cells positive and cells negative to immunostaining contained in a blood sample is acquired using a digital camera, and classification and statistical analysis are performed based on the fluorescence image. In this conventional technique, a positive cell that emits strong fluorescence and a negative cell that emits no fluorescence (or that emits weak fluorescence) are discriminated based on fluorescence intensities in the fluorescence image.

That is, in staining a cell population by a method such as immunostaining, it is determined that a cell (positive cell) whose fluorescence intensity is a threshold value or more presents a desired antigen-antibody reaction, whereas it is determined that a cell (negative cell) whose fluorescence intensity is the threshold value or less does not present the desired antigen-antibody reaction. Based on the determination result, a ratio of cells that present the desired antigen-antibody reaction in the cell population can be calculated. A technique that discriminates a cell or a cell population using such a fluorescence intensity as an index is described in Patent Document 1.

CITATION LIST

Patent Literature

Patent Document 1: Japanese Patent Application Laid-Open Publication No. 2007-20422
Patent Document 2: International Publication No. 2016/121250

Non Patent Literature

Non Patent Document 1: Benjamin R. Lee et al., "A Digital Image Microscopy System for Rare-Event Detection Using Fluorescent Probes", Cytometry 10, 1989, pp. 256-262

SUMMARY OF INVENTION

Technical Problem

The present inventors have found that the conventional discrimination techniques have the following problem. That is, in the conventional discrimination techniques, since only the fluorescence intensity in the fluorescence image is used as the index, accurate discrimination is difficult. In a cell or a cell population whose thickness is large, since fluorescence is integrated by the thickness along an optical axis of an observation optical system and observed, a negative cell, whose expression rate of fluorescent dye is low, is sometimes erroneously determined as a positive cell whose fluorescence intensity is large. Conversely, in a cell or a cell population whose thickness is small, since the integrated amount of fluorescence along the optical axis of the observation optical system is small, a positive cell, whose expression rate of fluorescent dye is high, may be erroneously determined as a negative cell whose fluorescence intensity is small.

For example, as illustrated in FIG. 1, when a thickness of a positive cell 73p whose expression rate of fluorescent dye is high is small, and a thickness of a negative cell 73n whose expression rate of fluorescent dye is low is large, in some cases, the integrated amount of fluorescence for the positive cell 73p along the optical axis of the observation optical system is small, and the integrated amount of fluorescence for the negative cell 73n along the optical axis of the observation optical system is large, and in this case, an erroneous determination is made.

Further, as illustrated in FIG. 2, this case may be also an erroneous determination in which a large number of only the negative cells 73n are present in a certain well of a multiwell plate, a small number of only the positive cells 73p are present in another well, and the negative cells 73n and the positive cells 73p are mixed together in a still another well. That is, from only the integrated amount of fluorescence for each well, it is not possible to determine the mixing ratio of the negative cell 73n and the positive cell 73p in the well.

Such a problem is present not only in a case where a cell is discriminated based on a fluorescence intensity, but also in a case where another object is discriminated based on a fluorescence intensity.

An object of an embodiment is to provide a fluorescence measurement apparatus and a fluorescence measurement method that can accurately determine a fluorescence expression rate of an object in a region of interest.

Solution to Problem

An embodiment is a fluorescence measurement apparatus. The fluorescence measurement apparatus includes (1) a fluorescence image acquisition unit for acquiring a fluorescence image containing an object, (2) an interference image acquisition unit for acquiring an interference image containing the object, and (3) an operation unit for determining an optical thickness image based on the interference image acquired by the interference image acquisition unit, and determining, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

An embodiment is a fluorescence measurement method. The fluorescence measurement method includes (1) a fluorescence image acquisition step of acquiring a fluorescence image containing an object by a fluorescence image acquisition unit, (2) an interference image acquisition step of acquiring an interference image containing the object by an interference image acquisition unit, and (3) an operation step of determining an optical thickness image based on the interference image acquired by the interference image acquisition unit, and determining, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

Advantageous Effects of Invention

According to the embodiment, a fluorescence expression rate of an object in a region of interest can be accurately determined.

BRIEF DESCRIPTION OF DRAWINGS

FIG. 12 is a diagram showing an optical thickness image OT determined using the Formula (3) by the operation unit 4 based on the phase image Φ in FIG. 11.

FIG. 15 is a table listing an area, an average optical thickness, an average fluorescence intensity, and "average fluorescence intensity/average optical thickness" for each cell (each ROI).

DESCRIPTION OF EMBODIMENTS

Hereinafter, embodiments of a fluorescence measurement apparatus and a fluorescence measurement method will be described in detail with reference to the accompanying drawings. In the description of the drawings, the same elements will be denoted by the same reference signs, without redundant description. The present invention is not limited to these examples.

Figure 1:
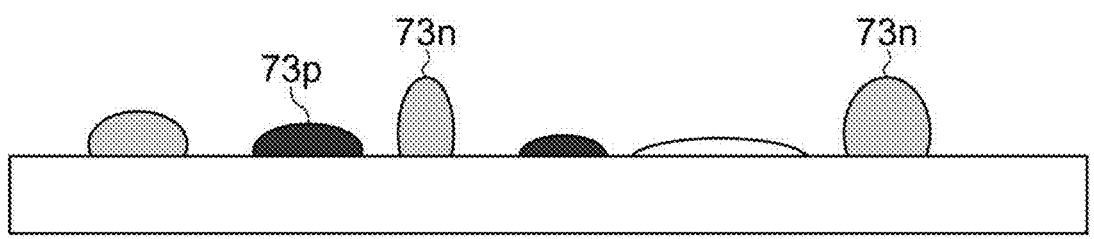
FIG. 1 is a diagram illustrating thicknesses of cells and integrated amounts of fluorescence.
Figure 2:
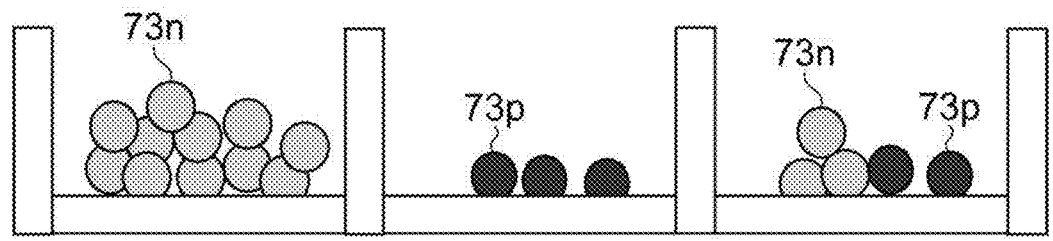
FIG. 2 is a diagram illustrating the number of cells, integrated amounts of fluorescence, and a mixing ratio.
Figure 3:
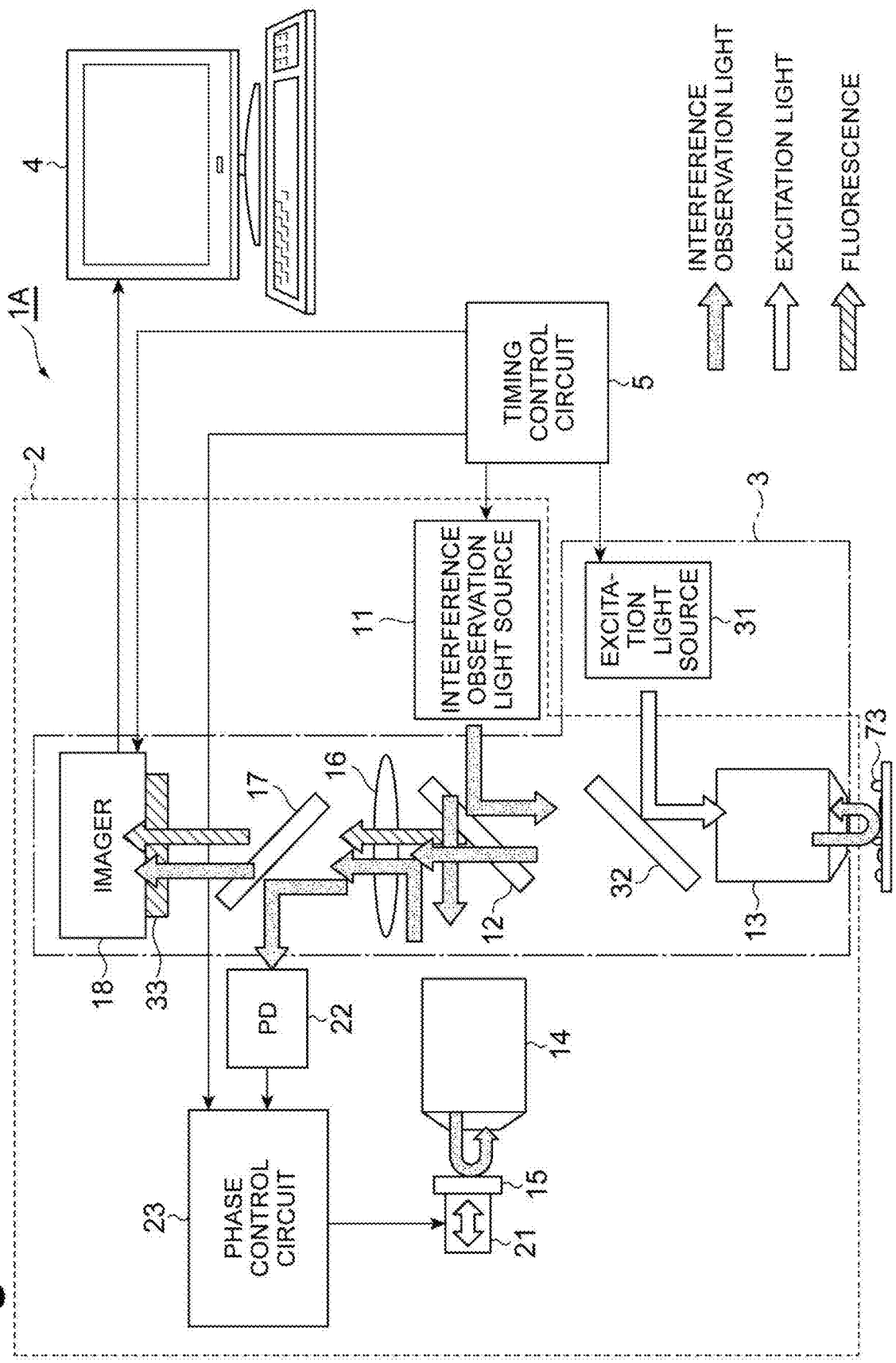
FIG. 3 is a diagram illustrating a configuration of a fluorescence measurement apparatus 1A.

FIG. 3 is a diagram illustrating a configuration of a fluorescence measurement apparatus 1A. The fluorescence measurement apparatus 1A includes an interference image acquisition unit 2, a fluorescence image acquisition unit 3, an operation unit 4, and a timing control circuit 5. The optical systems of the interference image acquisition unit 2 and the fluorescence image acquisition unit 3 are partially configured in common. The interference image acquisition unit 2 includes a light source 11, a beam splitter 12, an objective lens 13, an objective lens 14, a reference mirror 15, a tube lens 16, a beam splitter 17, an imager 18, a piezoelectric element 21, a photodetector 22, and a phase control circuit 23. The fluorescence image acquisition unit 3 includes an excitation light source 31, a beam splitter 32, the tube lens 16, an excitation light cut filter 33, and the imager 18.

The interference image acquisition unit 2 has a Michelson interferometer as a two-beam interferometer, and acquires an interference image of one or a plurality of objects. The fluorescence image acquisition unit 3 acquires a fluorescence image of the object. The operation unit 4 determines an optical thickness image based on the interference image acquired by the interference image acquisition unit 2. In addition, the operation unit 4 determines, in a region of interest set in common in both of the fluorescence image acquired by the fluorescence image acquisition unit 3 and the optical thickness image, a fluorescence expression rate of the object based on the integrated value of the fluorescence intensity in the fluorescence image and the integrated value of the optical thickness in the optical thickness image. The timing control circuit 5 controls light output timings of the light source 11 and the excitation light source 31 and an exposure timing of the imager 18, and thus, controls respective timings of interference image acquisition by the interference image acquisition unit 2 and fluorescence image acquisition by the fluorescence image acquisition unit 3.

The object is not limited to a specific cell or a biological sample. Examples of the object include a cultured cell, an immortalized cell, a primary cultured cell, a cancer cell, a fat cell, a liver cell, a cardiac muscle cell, a nerve cell, a glia cell, a somatic stein cell, an embryonic stein cell, a pluripotential stein cell, an iPS cell, and a cell aggregation (a colony or spheroid) generated based on the cells. Further, the object is not limited to a biological object, and includes an industrial sample, for example, a metal surface, a semiconductor surface, a glass surface, an inside of a semiconductor element, a resin material surface, a liquid crystal, and a high molecular compound.

Figure 4:
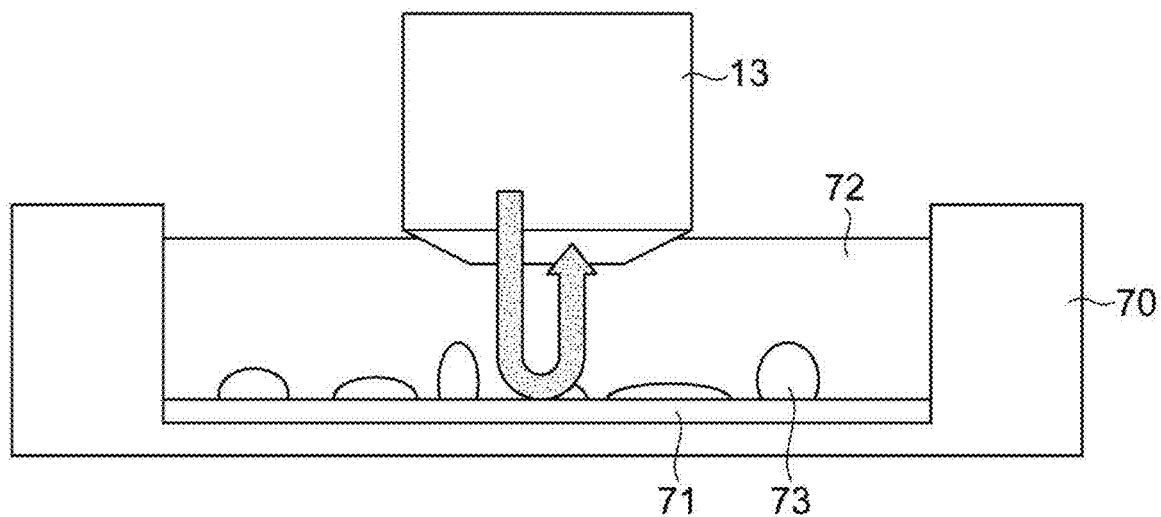
FIG. 4 is a diagram illustrating a configuration of a sample.

In the following description of the present embodiment, as a configuration example of the sample illustrated in FIG. 4, the object is assumed to be a cell 73 in a culture solution 72 placed in a container 70. A reflection enhancing coating 71 is provided on the inside of the bottom portion of the container 70.

The light source 11 outputs interference observation light. Preferably, the light source 11 outputs incoherent light. Examples of the light source 11 include a lamp light source such as a halogen lamp, a light emitting diode (LED) light source, a super luminescent diode (SLD) light source, and an amplified spontaneous emission (ASE) light source.

The beam splitter 12 is optically coupled to the light source 11, and constitutes a Michelson interferometer as a two-beam interferometer. The beam splitter 12 may be a half mirror, for example, in which the ratio of the reflectance and the transmittance is 50:50. The beam splitter 12 splits the light output from the light source 11 into two light beams to form first split light and second split light. The beam splitter 12 outputs the first split light to the objective lens 13, and outputs the second split light to the objective lens 14.

Further, the beam splitter 12 receives the first split light reflected by the reflection enhancing coating 71 through the objective lens 13, and receives the second split light reflected by the reference mirror 15 through the objective lens 14. Then, the beam splitter 12 combines the first split light and the second split light incident thereon, and outputs interference light to the tube lens 16.

The objective lens 13 is optically coupled to the beam splitter 12, and focuses the first split light output from the beam splitter 12 to the cell 73 in the container 70. Further, the objective lens 13 receives the first split light reflected by the reflection enhancing coating 71, and outputs the first split light to the beam splitter 12.

On the optical path of the first split light between the beam splitter 12 and the objective lens 13, the beam splitter 32 is provided. The beam splitter 32 is optically coupled to the excitation light source 31. The beam splitter 32 partially reflects the excitation light output from the excitation light source 31, the first split light in the light output from the light source 11, and the fluorescence generated in the cell 73 to which the excitation light is applied, and transmits the remaining parts.

The objective lens 13 focuses the excitation light reached from the beam splitter 32 to the cell 73 in the container 70. Further, the objective lens 13 receives the fluorescence generated in the cell 73, and outputs the fluorescence to the beam splitter 12. The beam splitter 12 outputs the fluorescence to the tube lens 16.

The objective lens 14 is optically coupled to the beam splitter 12, and focuses the second split light output from the beam splitter 12 to the reflection surface of the reference mirror 15. Further, the objective lens 14 receives the second split light reflected by the reflection surface of the reference mirror 15, and outputs the second split light to the beam splitter 12.

The tube lens 16 is optically coupled to the beam splitter 12 constituting the interference optical system, and forms an image of the interference light and the fluorescence output from the beam splitter 12 on the imaging plane of the imager 18 through the beam splitter 17. The beam splitter 17 partially reflects the interference light and the fluorescence, and transmits the remaining parts. The ratio of the reflectance and the transmittance in the beam splitter 17 is 20:80, for example.

The imager 18 is optically coupled to the beam splitter 17, receives the interference light reached from the beam splitter 17 and acquires an interference image, and further, receives the fluorescence reached from the beam splitter 17 and acquires a fluorescence image. For example, the imager 18 is an image sensor, such as a CCD area image sensor and a CMOS area image sensor. The excitation light cut filter 33 provided in front of the light receiving plane of the imager 18 selectively transmits the interference light and the fluorescence, and selectively cuts off the excitation light.

The piezoelectric element 21 moves the reflection surface of the reference mirror 15 in the direction perpendicular to the reflection surface. The piezoelectric element 21 can adjust the optical path difference (that is, the phase difference) between the two light beams in the two-beam interferometer by moving the reflection surface. The piezoelectric element 21 can determine the position of the reflection surface of the reference mirror 15 with the resolution less than the wavelength. In the two-beam interferometer, the optical path difference between two light beams is variable.

In addition, assuming that the optical distance from the beam splitter 12 to the reflection enhancing coating 71 is L1, and the optical distance from the beam splitter 12 to the reflection surface of the reference mirror 15 is L2, the optical path difference between the two light beams in the two-beam interferometer is 2(L1−L2). When the optical path difference is the coherence length of the output light of the light source 11 or less, the imager 18 can acquire a clear interference image. When the center wavelength of the output light of the light source 11 is $\lambda 0$, a phase difference $\Delta\phi$ between the two light beams in the two-beam interferometer is expressed by the following Formula.

[Formula 1]

$$\Delta\phi = 2\pi \times 2 \times (L1-L2)/\lambda 0 \quad (1)$$

The photodetector 22 is optically coupled to the beam splitter 17, receives the interference light reached from the beam splitter 17, and outputs a detection signal. Examples of the photodetector 22 include a photodiode, avalanche photodiode, and photomultiplier tube, and further, may include a line sensor (linear sensor), CCD area image sensor, CMOS area image sensor, and any other sensor.

The phase control circuit 23 is electrically coupled to the photodetector 22, and receives the detection signal output from the photodetector 22. Further, the phase control circuit 23 is electrically coupled to the piezoelectric element 21, and controls the adjustment operation of the optical path difference by the piezoelectric element 21. The phase control circuit 23 detects the optical path difference between the two light beams in the two-beam interferometer based on the received detection signal. Then, the phase control circuit 23 controls the adjustment operation of the optical path difference by the piezoelectric element 21 by feedback control based on the detection result. Thus, a state (a locked state) can be achieved in which the optical path difference between the two light beams in the two-beam interferometer is stabilized at the set value.

The interference image acquisition unit 2 can acquire the interference image of the object (cell 73) by imaging with the imager 18 in the locked state. The fluorescence image acquisition unit 3 can acquire the fluorescence image of the object (cell 73) by imaging with the imager 18. The operation unit 4 determines the optical thickness image of the object based on the interference image acquired by the imager 18 of the interference image acquisition unit 2, and determines the fluorescence expression rate of the object in the region of interest based on the optical thickness image and the fluorescence image.

The operation unit 4 may be a computer, such as a personal computer and a tablet terminal, including a processor (for example, a CPU) and a storage unit (for example, a RANI or a storage). Further, the operation unit 4 may be a microcomputer or an FPGA. Further, the operation unit 4 may include an input unit (a keyboard, a mouse, and a tablet terminal, for example) that accepts inputs from an operator, and a display unit (a display, and a tablet terminal, for example) that displays the interference image and the optical thickness image, and the like. Further, the operation unit 4 preferably has functions that displays images on a screen and accepts the instruction of a region on the screen by the operator.

The operation of the interference image acquisition unit 2 is as follows. The light output from the light source 11 is split into two light beams by the beam splitter 12 to form the first split light and the second split light, and the first split light and the second split light are output from the beam splitter 12. The first split light output from the beam splitter 12 is focused to the cell 73 in the container 70 by the objective lens 13 through the beam splitter 32, and reflected by the reflection enhancing coating 71 provided on the inner side of the bottom portion of the container 70. The first split light reflected by the reflection enhancing coating 71 is input to the beam splitter 12 through the objective lens 13 and the beam splitter 32. The second split light output from the beam splitter 12 is focused to the reflection surface of the reference mirror 15 by the objective lens 14, and reflected by the reflection surface. The second split light reflected by the reflection surface of the reference mirror 15 is input to the beam splitter 12 through the objective lens 14.

The first split light input from the objective lens 13 to the beam splitter 12 and the second split light input from the objective lens 14 to the beam splitter 12 are combined by the beam splitter 12, and the interference light is output from the beam splitter 12. The interference light is passed through the tube lens 16, then split into two beams by the beam splitter 17, and received by the imager 18 and the photodetector 22, respectively. The detection signal is output from the photodetector 22 receiving the interference light, and the optical path difference between the two light beams in the two-beam interferometer is detected by the phase control circuit 23 based on the detection signal. Then, by feedback control on the piezoelectric element 21 by the phase control circuit 23, a state is achieved (a locked state) in which the optical path difference between the two light beams in the two-beam interferometer is stabilized at the set value. In the locked state, the interference image is acquired by the imager 18 receiving the interference light, and the interference image is output to the operation unit 4. Then, the operation unit 4 determines the optical thickness image of the object (cell 73) based on the interference image.

The operation unit 4 determines the optical thickness image from a plurality of interference images by a phase shift method. That is, the interference image acquisition unit 2 achieves the state in which the optical path difference in the two-beam interferometer is stabilized at a plurality of set values different from each other, and acquires an interference image in each of the states. The operation unit 4 can determine a phase image based on a plurality of interference images acquired by the interference image acquisition unit 2 (see Patent Document 2). Further, the operation unit 4 can determine an optical thickness image from the phase image.

For example, the interference image acquisition unit 2 stabilizes the phase difference of the interference light in a certain initial phase by feedback control using the piezoelectric element 21, the photodetector 22, and the phase control circuit 23, and acquires an interference image I1 by the imager 18 in the state in which the phase difference is stabilized. Subsequently, the interference image acquisition unit 2 stabilizes the phase difference of the interference light in "the initial phase+π/2" using the piezoelectric element 21, the photodetector 22, and the phase control circuit 23, and acquires an interference image I2 by the imager 18 in the state in which the phase difference is stabilized. Similarly, the interference image acquisition unit 2 acquires an interference image I3 by the imager 18 in the state in which the phase difference of the interference light is stabilized in "the initial phase+π", acquires an interference image I4 by the imager 18 in the state in which the phase difference of the interference light is stabilized in "the initial phase+3π/2", and acquires an interference image I5 by the imager 18 in the state in which the phase difference of the interference light is stabilized in "the initial phase+2π".

The operation unit 4 performs an operation of the following Formula (2) using these five interference images I1 to I5, and determines a phase image Φ. arg is an operator that acquires the argument of the complex number. i is the imaginary unit. After applying a phase unwrap process and a background distortion correction process to the phase image Φ, the operation unit 4 determines an optical thickness OT by the following Formula (3), and determines the optical thickness image. In addition, the parameters shown in these Formulas are the functions of the pixel position (x, y), and the operations of these Formulas are performed for each pixel.

[Formula 2]

$$\Phi = \arg\{(I1 - 2 \times I3 + I5) + i(2 \times I2 - 2 \times I4)\} \quad (2)$$

[Formula 3]

$$OT = \Phi \times \frac{\lambda 0}{4\pi} \quad (3)$$

For background correction, a polynomial function (for example, a Zernike polynomial) where x and y are variables is used, and thus, an excellent (flat) background can be obtained. Further, in a case where the spacial frequency of the distortion component in the background is sufficiently lower than the spacial frequency of individual samples, a high-pass filtering process can also be applied. The flatness of the background of the optical thickness image is preferably less than 5 nm in the standard deviation of the optical thickness.

The optical thickness OT expresses the amount of the phase change given to the light transmitted through the sample. The optical thickness OT is given by the following Formula, where the thickness of the cell 73 is d, the average refractive index of the cell 73 is $n_c$, and the refractive index of the culture solution 72 is $n_m$.

[Formula 4]

$$OT = d \times (n_c - n_m) \quad (4)$$

The operation of the fluorescence image acquisition unit 3 is as follows. The excitation light output from the excitation light source 31 is reflected by the beam splitter 32, and focused and applied to the cell 73 in the container 70 by the objective lens 13. The fluorescence generated in the cell 73 by the application of the excitation light is received by the imager 18 through the objective lens 13, the beam splitter 32, the beam splitter 12, the tube lens 16, the beam splitter 17, and the excitation light cut filter 33. The imager 18 receiving the fluorescence can acquire a fluorescence image. The operation unit 4 inputs the fluorescence image.

Next, using FIG. 5 to FIG. 7, configurations of modifications of the fluorescence measurement apparatus will be described. The configuration of the fluorescence measurement apparatus (in particular, the configurations of the interference image acquisition unit and the fluorescence image acquisition unit) can be modified in various forms. In addition, in FIG. 5 to FIG. 7 illustrating the configurations of the modifications, the operation unit and the timing control circuit are omitted, and further, the beam splitter 17, the photodetector 22, and the phase control circuit 23 of the interference image acquisition unit are also omitted.

Figure 5:
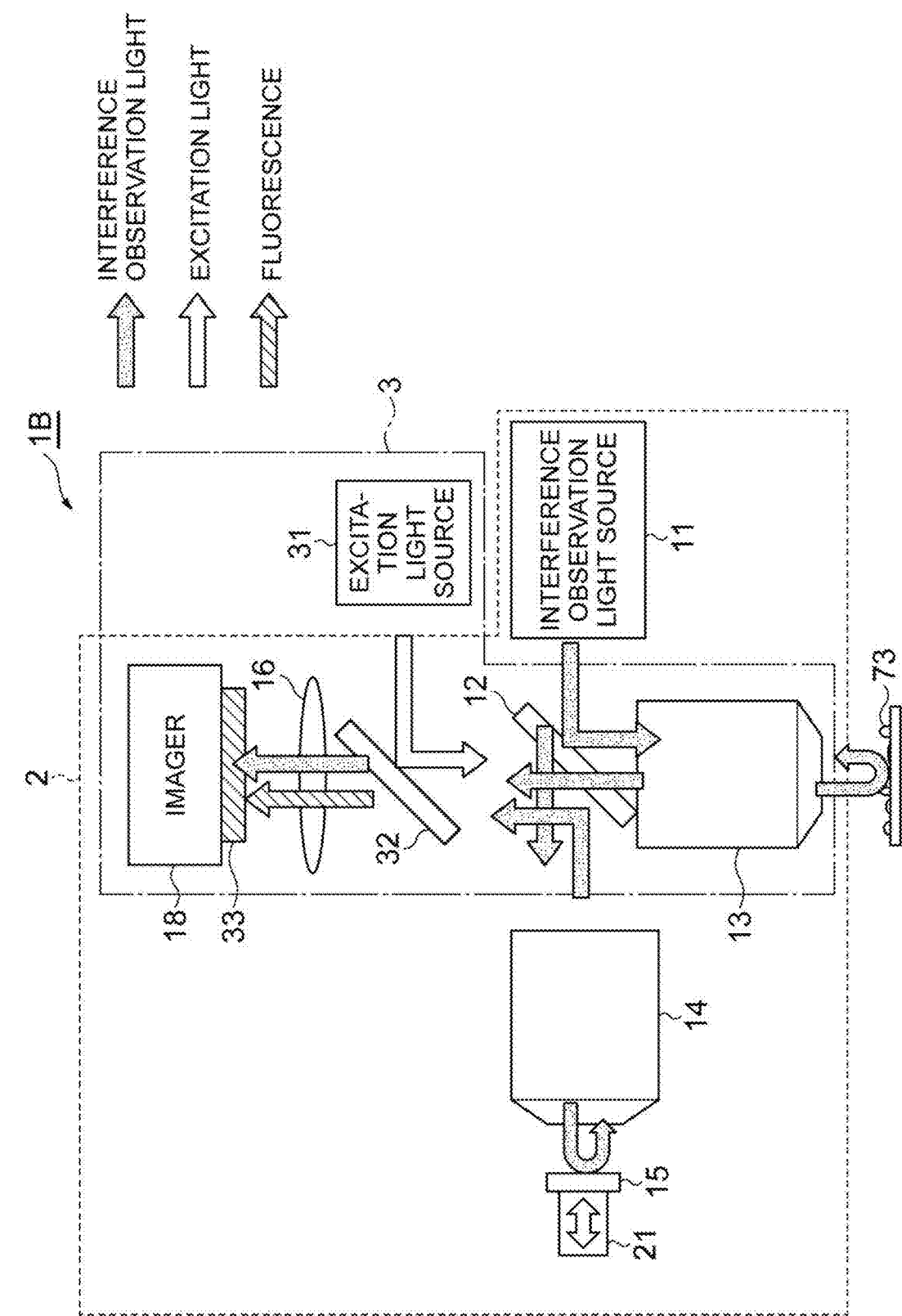
FIG. 5 is a diagram illustrating a configuration of a fluorescence measurement apparatus 1B of a first modification.

Compared with the configuration of the fluorescence measurement apparatus 1A illustrated in FIG. 3, a fluorescence measurement apparatus 1B of a first modification illustrated in FIG. 5 has configurations almost similar to the configurations of the interference image acquisition unit 2 and the fluorescence image acquisition unit 3, however, the apparatus is different in the position on which the beam splitter 32 is provided. In the fluorescence measurement apparatus 1A illustrated in FIG. 3, the beam splitter 32 is provided in the two-beam interferometer, whereas in the fluorescence measurement apparatus 1B of the first modification illustrated in FIG. 5, the beam splitter 32 is provided outside the two-beam interferometer on the optical path between the beam splitter 12 and the tube lens 16.

Figure 6:
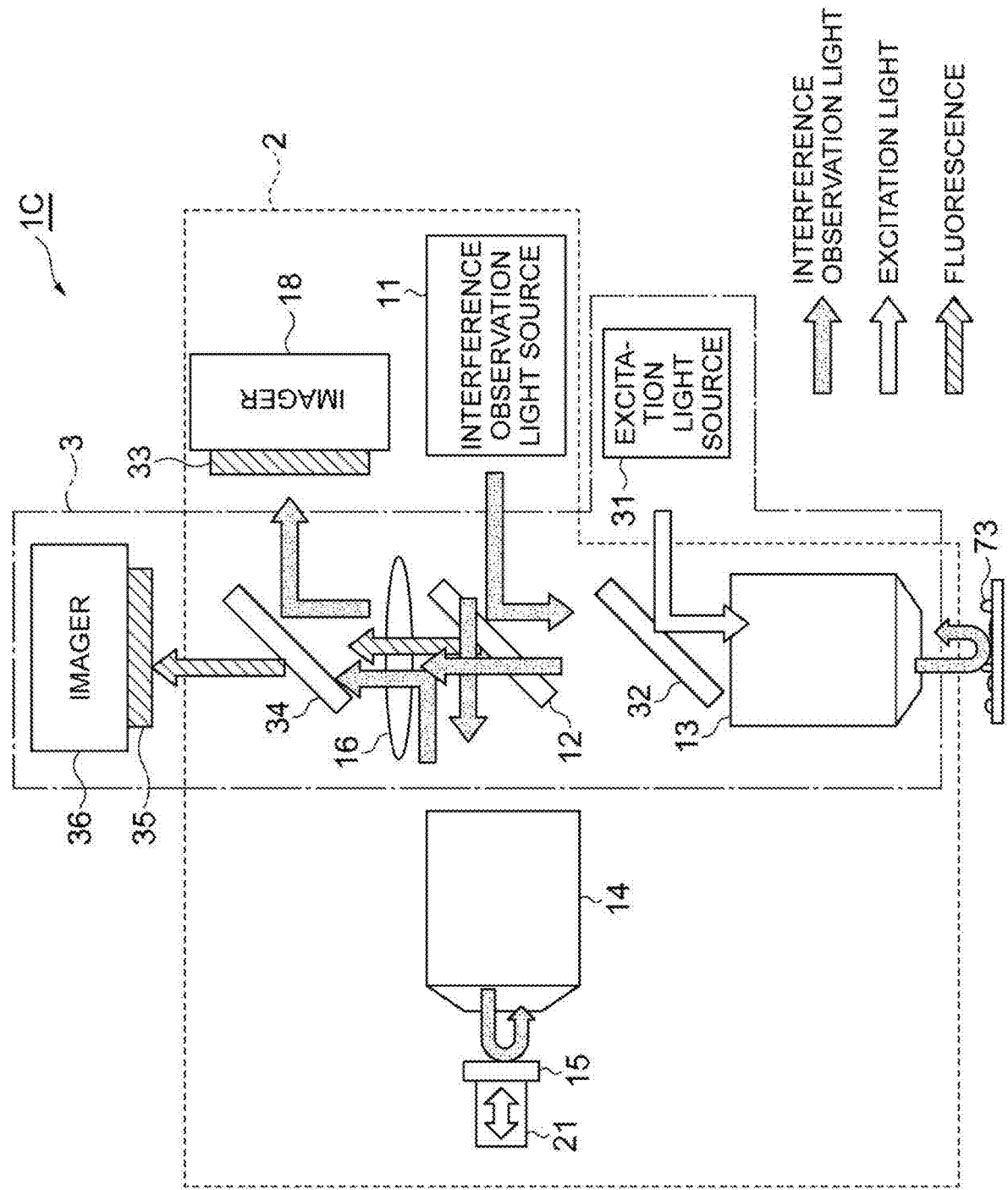
FIG. 6 is a diagram illustrating a configuration of a fluorescence measurement apparatus 1C of a second modification.

Compared with the configuration of the fluorescence measurement apparatus 1A illustrated in FIG. 3, a fluorescence measurement apparatus 1C of a second modification illustrated in FIG. 6 is different in that the apparatus further includes a dichroic mirror 34 and a fluorescence transmission filter 35 and further includes a fluorescence image acquisition imager 36 in addition to the interference image acquisition imager 18. The dichroic mirror 34 is optically coupled to the beam splitter 12, and receives interference light and fluorescence output from the beam splitter 12. The dichroic mirror 34 selectively reflects the interference light and selectively transmits the fluorescence in the interference light and the fluorescence incident thereon. The interference image acquisition imager 18 receives the interference light reflected by the dichroic mirror 34, and acquires an interference image. The fluorescence image acquisition imager 36 receives the fluorescence transmitted through the dichroic mirror 34, and acquires a fluorescence image. The fluorescence transmission filter 35 provided in front of the light receiving plane of the imager 36 selectively transmits the fluorescence.

Figure 7:
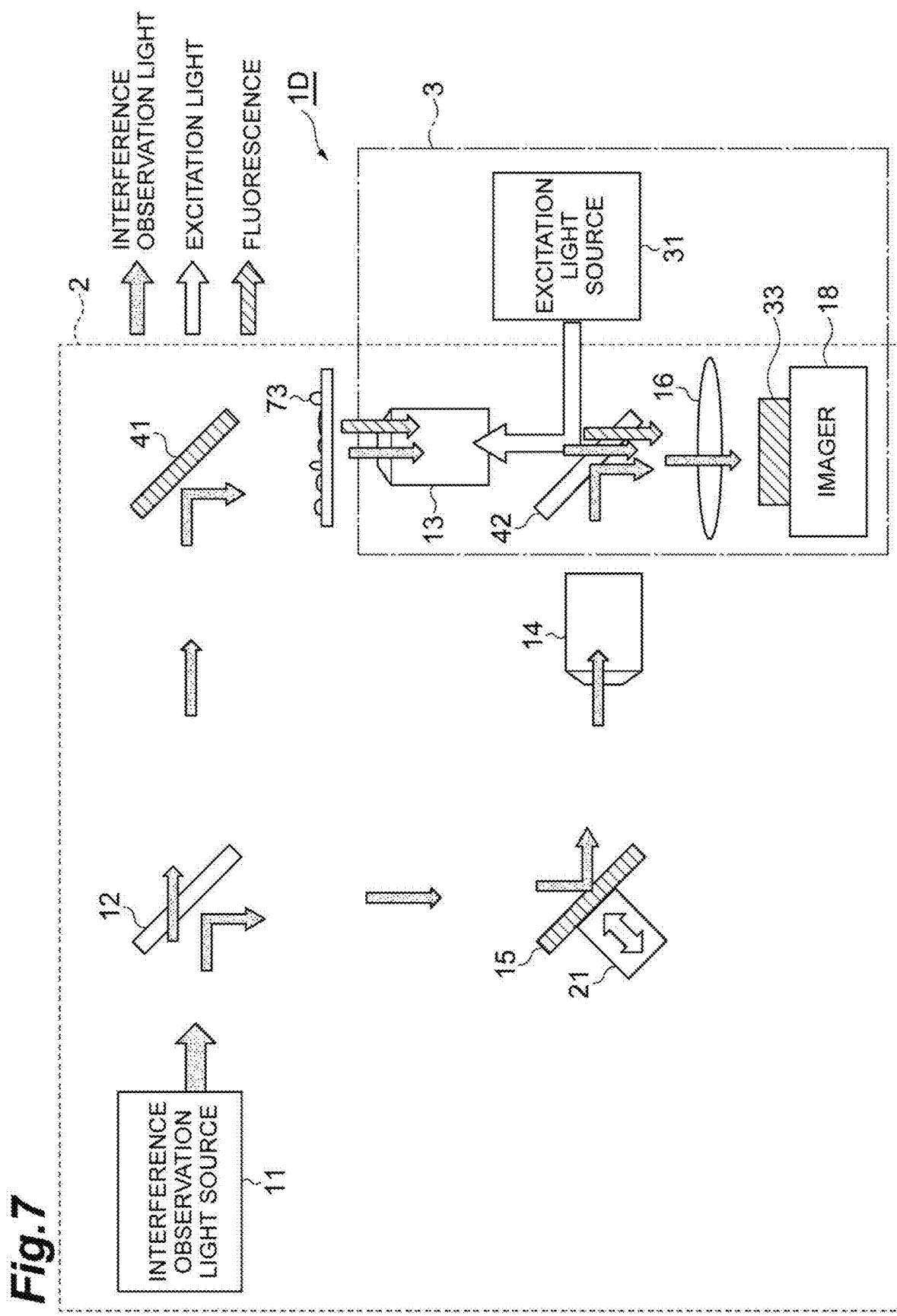
FIG. 7 is a diagram illustrating a configuration of a fluorescence measurement apparatus 1D of a third modification.

Compared with the configurations of the above fluorescence measurement apparatuses 1A to 1C, a fluorescence measurement apparatus 1D of a third modification illustrated in FIG. 7 is different in that a Mach-Zehnder interferometer is included as a two-beam interferometer. In the fluorescence measurement apparatus 1D of the third modification, interference observation light output from the light source 11 is split into two light beams by the beam splitter 12 to from first split light and second split light, and the first split light and the second split light are output from the beam splitter 12. The first split light output from the beam splitter 12 is reflected by a mirror 41, transmitted through the cell 73, and input to a beam splitter 42 through the objective lens 13. The second split light output from the beam splitter 12 is reflected by the reference mirror 15, and input to the beam splitter 42 through the objective lens 14.

The first split light input from the objective lens 13 to the beam splitter 42 and the second split light input from the objective lens 14 to the beam splitter 42 are combined by the beam splitter 42, and interference light is output from the beam splitter 42. The interference light is received by the imager 18 through the tube lens 16. In a state (a locked state) in which the optical path difference between the two light beams in the two-beam interferometer is stabilized at the set value, the imager 18 receiving the interference light acquires an interference image, and the interference image is output to the operation unit 4. Then, the operation unit 4 determines the optical thickness image of the object (cell 73) based on the interference image.

The excitation light output from the excitation light source 31 is reflected by the beam splitter 42, and focused and applied to the cell 73 by the objective lens 13. The fluorescence generated in the cell 73 by the application of the excitation light is received by the imager 18 through the objective lens 13, the beam splitter 42, the tube lens 16, and the excitation light cut filter 33. The imager 18 receiving the fluorescence can acquire a fluorescence image. The operation unit 4 inputs the fluorescence image.

In addition, in the configuration examples in FIG. 3, FIG. 5, FIG. 6, and FIG. 7, in some cases, the beam splitter can be used instead of the dichroic mirror, and conversely, the dichroic mirror can be used instead of the beam splitter. In the case of the beam splitter, the ratio of the reflectance and the transmittance is 20:80, for example.

In any of the configurations of the fluorescence measurement apparatuses 1A to 1D, the interference observation light output from the light source 11 passes the two-beam interferometer (a Michelson interferometer or a Mach-Zehnder interferometer), also passes a cell placed on the path in the two-beam interferometer, and forms an interference image on the light receiving plane of the imager. Further, the fluorescence generated in the cell by the application of the excitation light output from the excitation light source 31 forms a fluorescence image on the light receiving plane of the imager. In the fluorescence measurement apparatuses 1A to 1D, parts of the optical systems (in particular, the objective lens 13) of the interference image acquisition unit 2 and the fluorescence image acquisition unit 3 are configured in common, and the interference image and the fluorescence image can be acquired for substantially the same field of view.

The fluorescence measurement apparatuses 1A to 1D can acquire the interference image and the fluorescence image almost simultaneously. The fluorescence measurement apparatus 1C of the second modification separately includes the interference image acquisition imager 18 and the fluorescence image acquisition imager 36, and thus, the interference image and the fluorescence image can be acquired simultaneously. The fluorescence measurement apparatus 1C of the second modification may not include the timing control circuit.

The fluorescence measurement apparatuses 1A, 1B, and 1D can alternately acquire the interference image and the fluorescence image by time division using one imager 18. Since the exposure time for imaging each of the interference image and the fluorescence image is short, the fluorescence measurement apparatuses 1A, 1B, and 1D can acquire the interference image and the fluorescence image almost simultaneously. For example, it is possible that the exposure time necessary to image the fluorescence is about a few hundreds milliseconds to a few seconds, whereas the exposure time necessary to image the interference is less than 100 milliseconds. Assuming that the interference is imaged immediately after the fluorescence is imaged or the fluorescence is imaged immediately after the interference is imaged, it is thought that a large motion artifact is not generated compared with the exposure time for the fluorescence, and substantially simultaneous imaging can be regarded, even in the case of time division imaging.

The fluorescence measurement apparatus of the present embodiment only has to have a configuration that can acquire the interference image and the fluorescence image almost simultaneously for substantially the same field of view. That is, the two-beam interferometer in the interference image acquisition unit 2 may be any of a Michelson interferometer and a Mach-Zehnder interferometer. The position at which the excitation light is introduced may be in the inside or on the outside of the two-beam interferometer. The interference image and the fluorescence image may be alternately imaged using one imager, or the interference image acquisition imager and the fluorescence image acquisition imager may be separately included.

Further, in order to acquire the interference image and the fluorescence image for substantially the same field of view, the optical systems of the interference image acquisition unit and the fluorescence image acquisition unit are preferably partially configured in common, however, the interference image acquisition unit and the fluorescence image acquisition unit may not include the common part of the optical systems. Even though the interference image acquisition unit and the fluorescence image acquisition unit are separate optical systems, these units can only have to acquire the interference image and the fluorescence image for substantially the same field of view.

Figure 8:
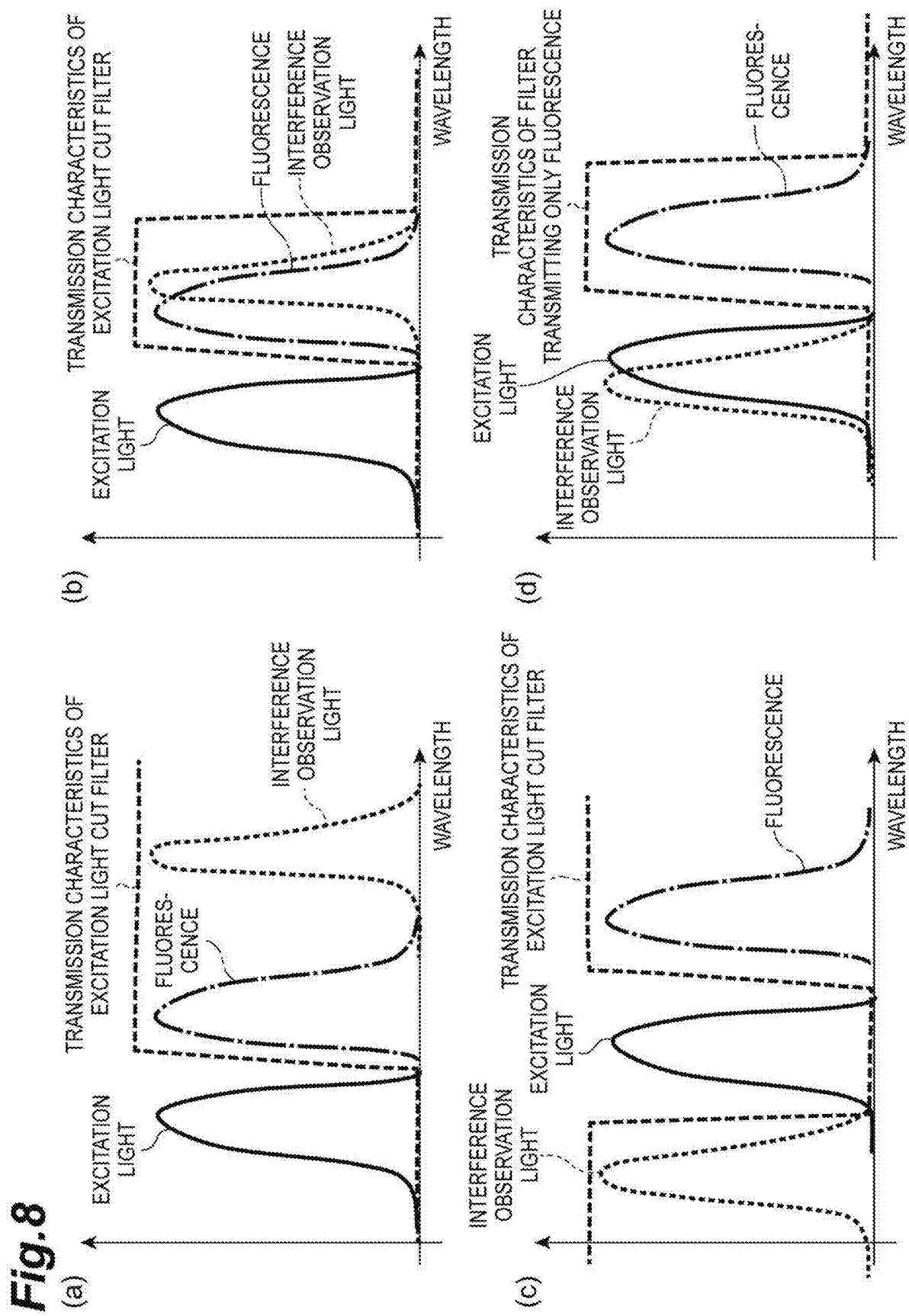
FIG. 8 includes diagrams illustrating examples of a relationship between wavelength ranges of interference observation light, excitation light, and fluorescence, and illustrates (a) a case where the wavelength range of the interference observation light is longer than the wavelength range of the fluorescence, (b) a case where the wavelength range of the interference observation light is partially overlapped with the wavelength range of the fluorescence, (c) a case where the wavelength range of the interference observation light is shorter than the wavelength range of the excitation light, and (d) a case where the wavelength range of the interference observation light is partially overlapped with the wavelength range of the excitation light.

Next, using FIG. 8, the relationship between the wavelength range of the interference observation light output from the light source 11, the wavelength range of the excitation light output from the excitation light source 31, and the wavelength range of the fluorescence generated in the cell 73 by the application of the excitation light will be described. FIG. 8 includes diagrams illustrating examples of the relationship between the wavelength ranges of the interference observation light, the excitation light, and the fluorescence. In general, the wavelength range of the fluorescence is located on the long wavelength side from the wavelength range of the excitation light.

In the example shown in (a) in FIG. 8, the wavelength range of the interference observation light is longer than the wavelength range of the fluorescence, and apart from the wavelength range of the fluorescence to a degree that the interference observation light can be separated from the fluorescence by a spectroscopic method. In this case, the interference image and the fluorescence image can be alternately acquired by time division using one imager, or the interference image and the fluorescence image can be also preferably acquired simultaneously using two imagers.

In the example shown in (b) in FIG. 8, the wavelength range of the interference observation light is partially overlapped with the wavelength range of the fluorescence. In this case, the interference image and the fluorescence image can be alternately acquired by time division using one imager. This is preferable because the chromatic aberration between the interference image and the fluorescence image can be minimized. However, the interference image and the fluorescence image cannot be acquired simultaneously using two imagers.

In the example shown in (c) in FIG. 8, the wavelength range of the interference observation light is shorter than the wavelength range of the excitation light, and apart from the wavelength range of the excitation light to a degree that the interference observation light can be separated from the excitation light by a spectroscopic method. In this case, the interference image and the fluorescence image can be alternately acquired by time division using one imager, or the interference image and the fluorescence image can also be acquired simultaneously using two imagers. However, in some cases, the chromatic aberration between the interference image and the fluorescence image causes a problem, and in this case, an optical system that accurately corrects the chromatic aberration is desirably used.

In the example shown in (d) in FIG. 8, the wavelength range of the interference observation light is partially overlapped with the wavelength range of the excitation light. In this case, the interference image and the fluorescence image can be alternately acquired by time division using one imager, however, the interference image and the fluorescence image cannot be acquired simultaneously using two imagers.

Figure 9:
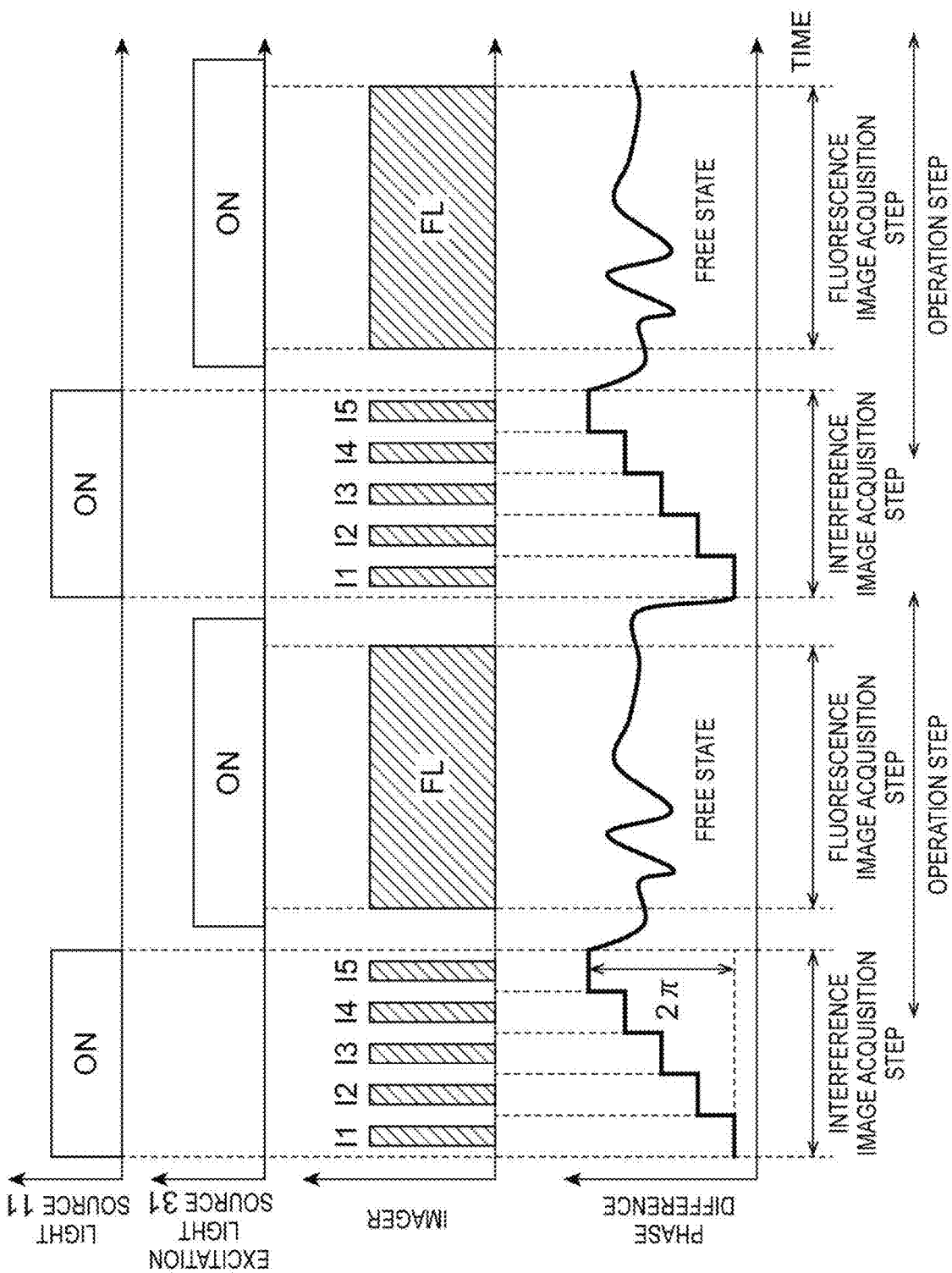
FIG. 9 is a timing chart illustrating an operation of the fluorescence measurement apparatus of the present embodiment and the fluorescence measurement method of the present embodiment.

Next, using FIG. 9, the operation of the fluorescence measurement apparatus of the present embodiment and the procedures of the fluorescence measurement method of the present embodiment will be described. FIG. 9 is a timing chart illustrating the operation of the fluorescence measurement apparatus of the present embodiment and the fluorescence measurement method of the present embodiment. This drawing illustrates examples of the light output period of the light source 11, the excitation light output period of the excitation light source 31, the exposure period of the imager, and the time variation in the phase difference of the interference light (phase difference between the two light beams in the two-beam interferometer). The fluorescence measurement method includes an interference image acquisition step, a fluorescence image acquisition step, and an operation step. This drawing illustrates an operation example in a case where the interference image acquisition step and the fluorescence image acquisition step are alternately performed by time division using one imager.

In the interference image acquisition step, the light source 11 outputs interference observation light, and the excitation light source 31 does not output excitation light. The interference image acquisition unit 2 sets the phase difference of the interference light in stages from the initial phase by $\pi/2$ by feedback control using the piezoelectric element 21, the photodetector 22, and the phase control circuit 23, and captures interference images I1 to I5 by the imager 18 in the state in which the phase difference is stabilized at the set value in each stage.

In the fluorescence image acquisition step, the light source 11 does not output interference observation light, and the excitation light source 31 outputs excitation light. The phase difference in this period is in a free state that is unstable. The fluorescence image acquisition unit 3 captures a fluorescence image FL by the imager 18.

The interference image acquisition step and the fluorescence image acquisition step are alternately repeated, and thus, the interference images I1 to I5 and the fluorescence image FL can be sequentially acquired. Further, as necessary, a configuration may be possible in which, after the interference image acquisition step and the fluorescence image acquisition step are performed for a certain field of view to acquire the interference image and the fluorescence image, a sample is moved by a motorized stage, for example, and the interference image acquisition step and the fluorescence image acquisition step are performed for another field of view to acquire the interference image and the fluorescence image. With this configuration, the interference image and the fluorescence image can be acquired for a plurality of fields of view.

In the operation step, the operation unit 4 determines the optical thickness image based on the interference images I1 to I5 acquired by the interference image acquisition unit 2 by the method described above. Then, in the region of interest set in common in both of the fluorescence image and the optical thickness image, the operation unit 4 determines the fluorescence expression rate of the cell based on the integrated value of the fluorescence intensity in the fluorescence image and the integrated value of the optical thickness in the optical thickness image.

In the operation step, the operation unit 4 performs respective processes of the calculation of the optical thickness image, the setting of the region of interest, and the calculation of the fluorescence expression rate, using the interference image and the fluorescence image acquired in the interference image acquisition step and the subsequent fluorescence image acquisition step, or using the fluorescence image and the interference image acquired in the fluorescence image acquisition step and the subsequent interference image acquisition step. The operation step may be performed in parallel with both or any one of the interference image acquisition step and the fluorescence image acquisition step.

In the following, the embodiment will be described more in detail while illustrating the configurations and example images of the specific example. The configuration of the fluorescence measurement apparatus 1A illustrated in FIG. 3 was used. As the light source 11, an LED having a center wavelength of 525 nm was used. As the excitation light source 31, a configuration was used in which an LED having a center wavelength of 475 nm is combined with an optical filter having a full width at half maximum of 25 nm with a center wavelength of 475 nm, and the band limitation was performed on the output light. The ratio of the reflectance and the transmittance of the beam splitter 12 was 50:50. The ratio of the reflectance and the transmittance of the beam splitter 17 was 20:80. The ratio of the reflectance and the transmittance of the beam splitter 32 was 20:80. As the excitation light cut filter 33, a long wavelength transmission filter having a cutoff wavelength of 500 nm was used.

The focal lengths of the objective lens 13 and the objective lens 14 were 9 mm. The focal length of the tube lens 16 was 125 mm. The size of the imaging element of the imager 18 was 4.8 mm×3.6 mm. The size of the field of view on the sample plane was 345.6 μm×259.2 μm. As the cells 73 of the sample, cultured cells derived from cervical cancer, which were stained with fluorescence using green fluorescent dye (green fluorescent protein, GFP) were seeded and used. The time interval in the acquisition of the interference images I1 to I5 was 67 milliseconds. The exposure time in the acquisition of the interference images was 0.5 milliseconds. The exposure time in the acquisition of the fluorescence image FL was 1500 milliseconds.

Figure 10:
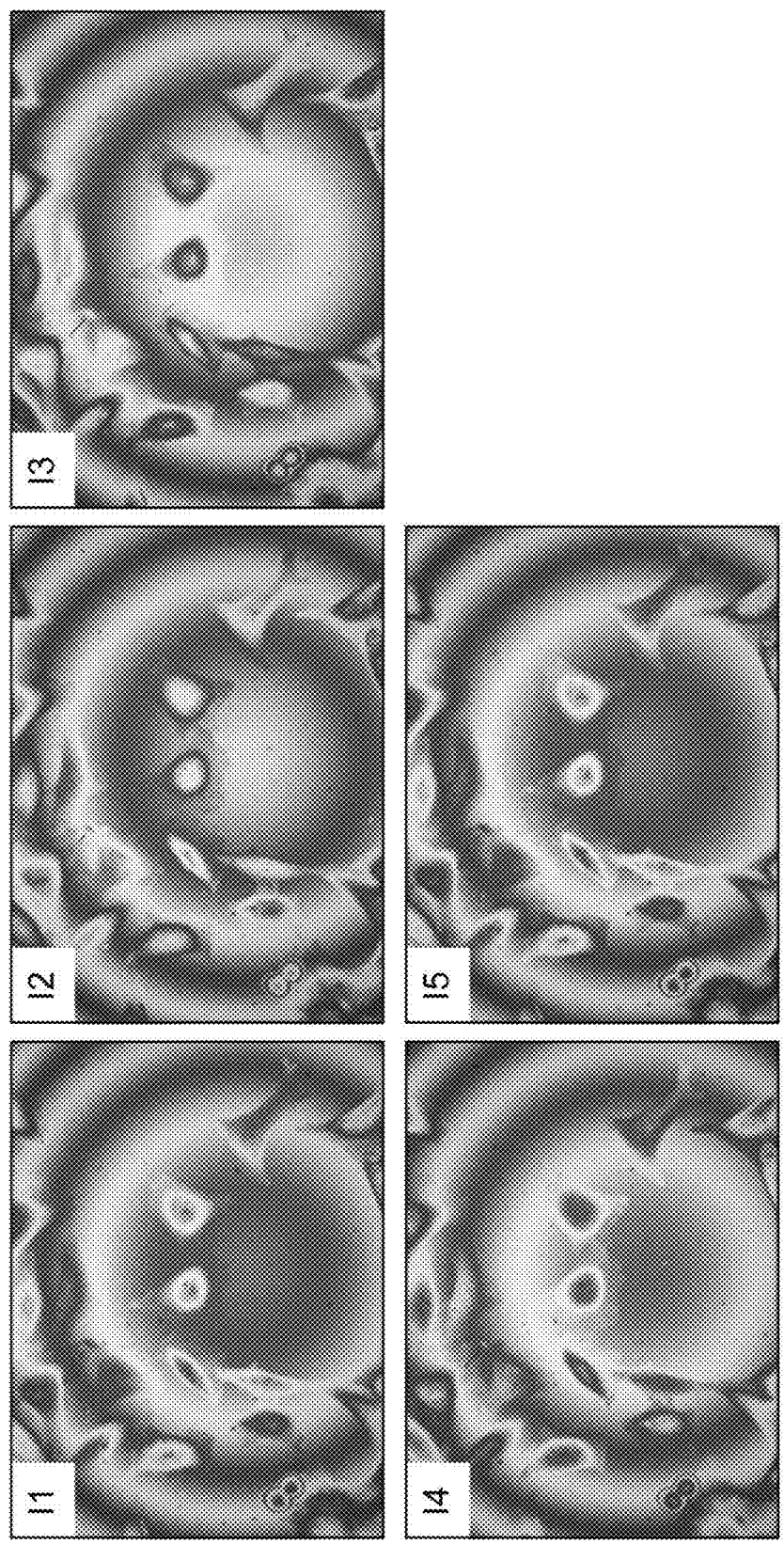
FIG. 10 is a diagram showing five interference images I1 to I5 acquired by an interference image acquisition unit 2.
Figure 11:
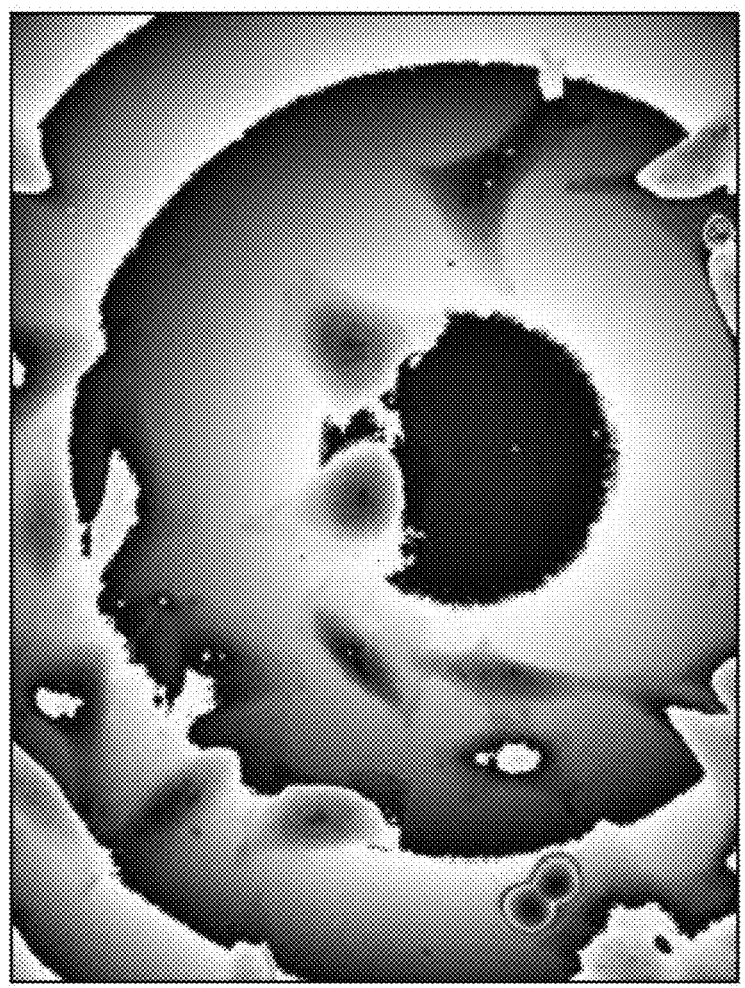
FIG. 11 is a diagram showing a phase image Φ determined using the Formula (2) by an operation unit 4 based on the interference images I1 to I5 in FIG. 10.
Figure 13:
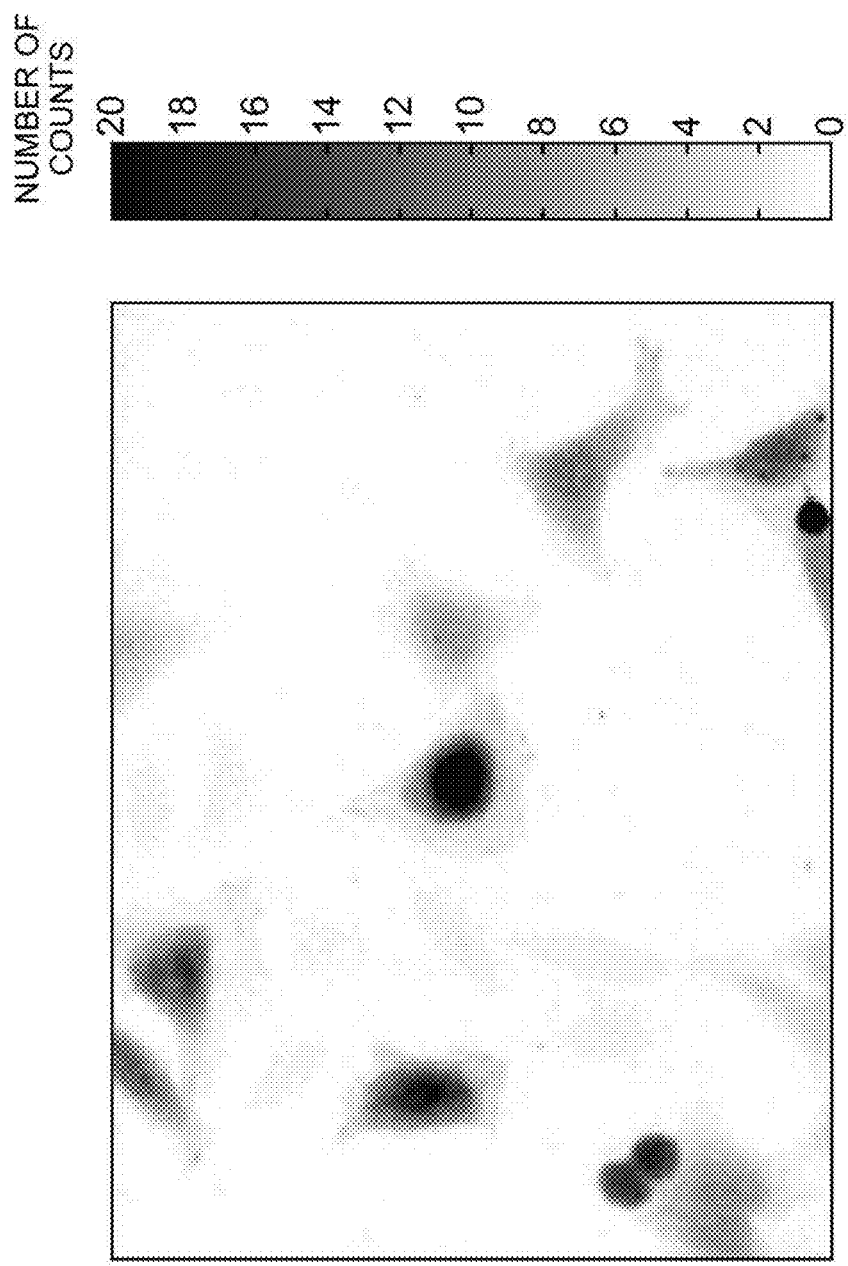
FIG. 13 is a diagram showing a fluorescence image FL acquired by a fluorescence image acquisition unit 3.
Figure 14:
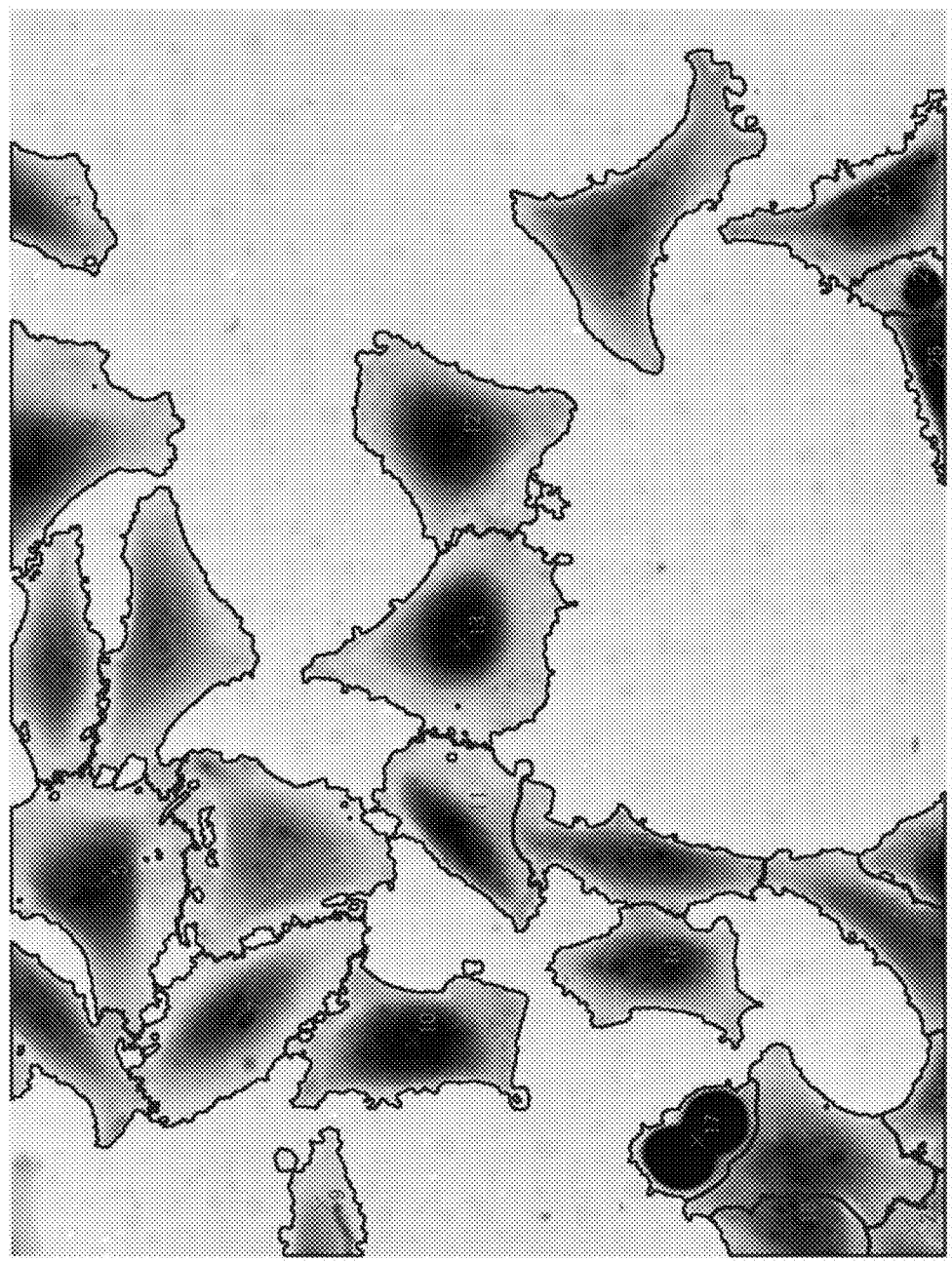
FIG. 14 is a diagram showing an optical thickness image in which cell regions are subjected to a segmentation process in the optical thickness image OT in FIG. 12.

FIG. 10 is a diagram showing five interference images I1 to I5 acquired by the interference image acquisition unit 2. FIG. 11 is a diagram showing a phase image Φ determined using the Formula (2) by the operation unit 4 based on the interference images I1 to I5 in FIG. 10. FIG. 12 is a diagram showing an optical thickness image OT determined using the Formula (3) by the operation unit 4 based on the phase image Φ in FIG. 11. FIG. 13 is a diagram showing a fluorescence image FL acquired by the fluorescence image acquisition unit 3. FIG. 14 is a diagram showing an optical thickness image in which the cell regions are subjected to the segmentation process in the optical thickness image OT in FIG. 12. These images are for the same field of view. From the optical thickness image after the segmentation process in FIG. 14, regions of individual cells can be clearly identified, and the presence of 26 cells is confirmed in the field of view of the image. In FIG. 14, numbers (#1 to #26) are assigned to the individual cells.

The operation unit 4 sets the regions of the individual objects as the regions of interest (ROIs). In each ROI set in common in both of the optical thickness image and the fluorescence image, the operation unit 4 determines the fluorescence expression rate of the object based on the integrated value of the fluorescence intensity in the fluorescence image and the integrated value of the optical thickness in the optical thickness image.

An average optical thickness in the ROI is a value obtained by dividing the optical thickness integrated value in the ROI by the number of pixels in the ROI, and expressed by the following Formula (5). An average fluorescence intensity in the ROI is a value obtained by dividing the fluorescence intensity integrated value in the ROI by the number of pixels in the ROI, and expressed by the following Formula (6). An "average fluorescence intensity/average optical thickness" in the ROI is expressed by the following Formula (7). The "average fluorescence intensity/average optical thickness" in the ROI is expressed as the ratio of the fluorescence intensity integrated value and the optical thickness integrated value in the ROI. The operation unit 4 determines the value obtained by dividing the fluorescence intensity integrated value by the optical thickness integrated value in the ROI, expressed by the Formula (7), as the index of the fluorescence expression rate of the object in the ROI.

[Formula 5]

$$\text{Average optical thickness} = \frac{\sum_{ROI} OT(x, y)}{\text{Number of pixels in } ROI} \quad (5)$$

[Formula 6]

$$\text{Average fluorescence intensity} = \frac{\sum_{ROI} FL(x, y)}{\text{Number of pixels in } ROI} \quad (6)$$

[Formula 7]

$$\frac{\text{Average fluorescence intensity}}{\text{Average optical thickness}} = \frac{\sum_{ROI} FL(x, y)}{\sum_{ROI} OT(x, y)} \quad (7)$$

Figure 16:
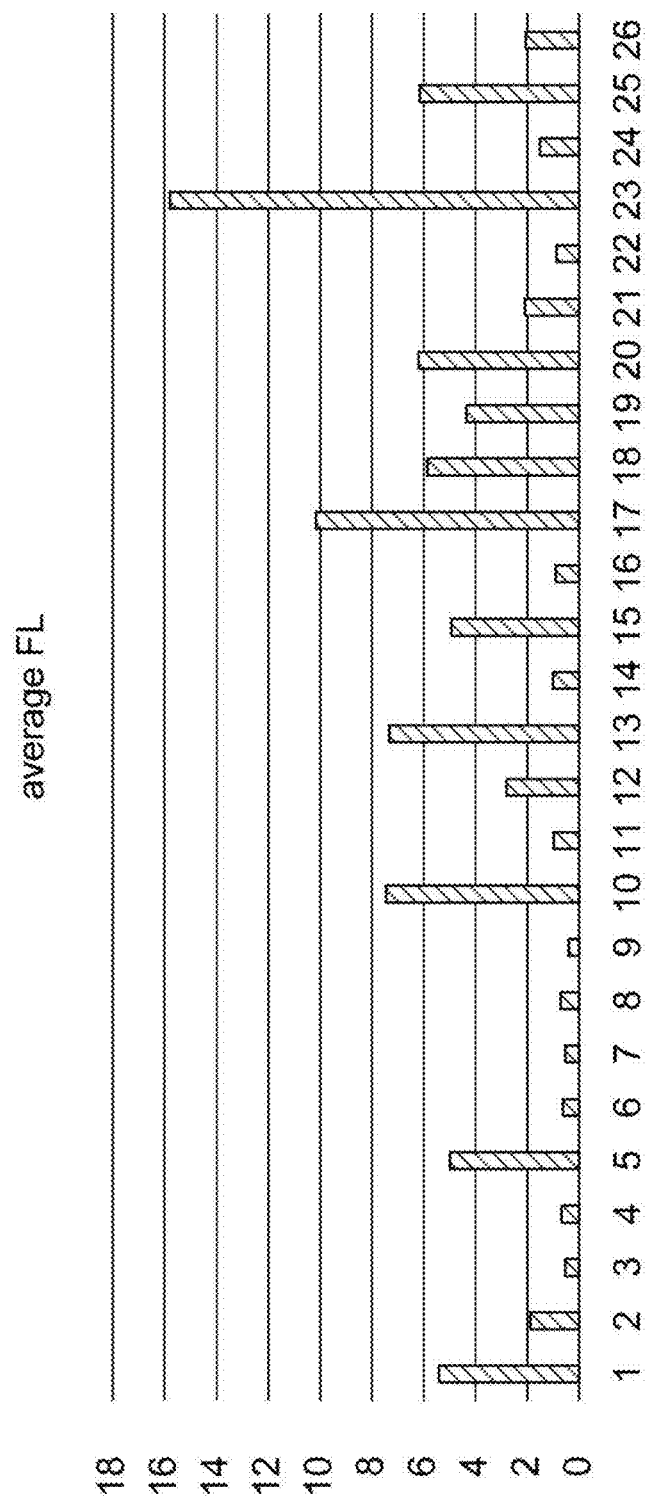
FIG. 16 is a graph showing the average fluorescence intensity for the ROIs.
Figure 17:
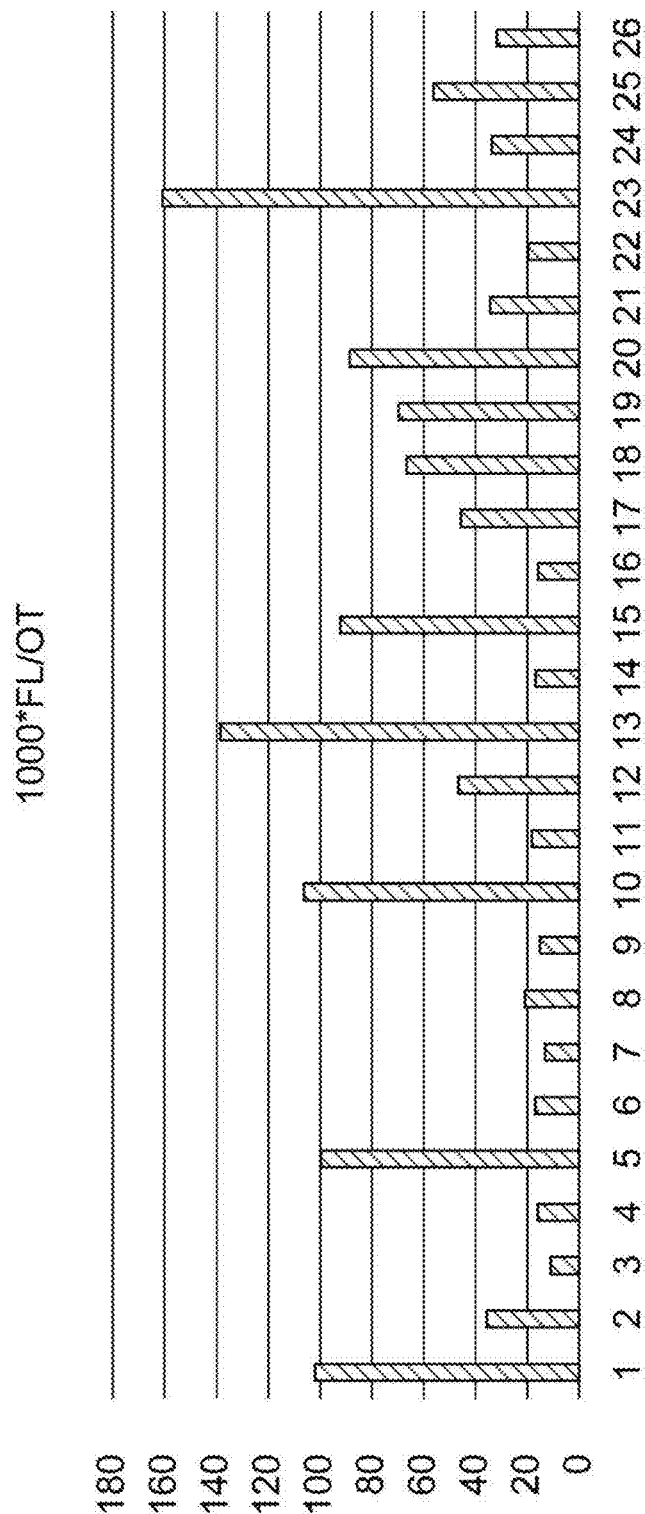
FIG. 17 is a graph showing the "average fluorescence intensity/average optical thickness" for the ROIs.

FIG. 15 is a table listing the area, the average optical thickness, the average fluorescence intensity, and the "average fluorescence intensity/average optical thickness" for each cell (each ROI). FIG. 16 is a graph showing the average fluorescence intensity for the ROIs. FIG. 17 is a graph showing the "average fluorescence intensity/average optical thickness" for the ROIs. In FIG. 16 and FIG. 17, the horizontal axis shows cell numbers.

Here, for example, it is determined that, in the simple evaluation by the average fluorescence intensity, cell #17 has the second strongest fluorescence in 26 cells and has a large GFP expression. However, in the evaluation by the "average fluorescence intensity/average optical thickness", cell #17 is in the 12th magnitude in 26 cells.

The optical thickness of the cell is proportional to the thickness of the cell in general, and thus, it is suggested that the cell whose optical thickness is large is physically thick as well. In the thick cell, the amount of fluorescence photons is integrated by the thickness, and therefore, in the simple evaluation by the average fluorescence intensity, there is a possibility that the expression rate relatively higher than the actual expression rate of fluorescent dye is estimated. On the other hand, when the evaluation based on the "average fluorescence intensity/average optical thickness" is performed, the fluorescence intensity is normalized by the optical thickness, and thus, the expression rate of fluorescent dye can be estimated more accurately.

Figure 18:
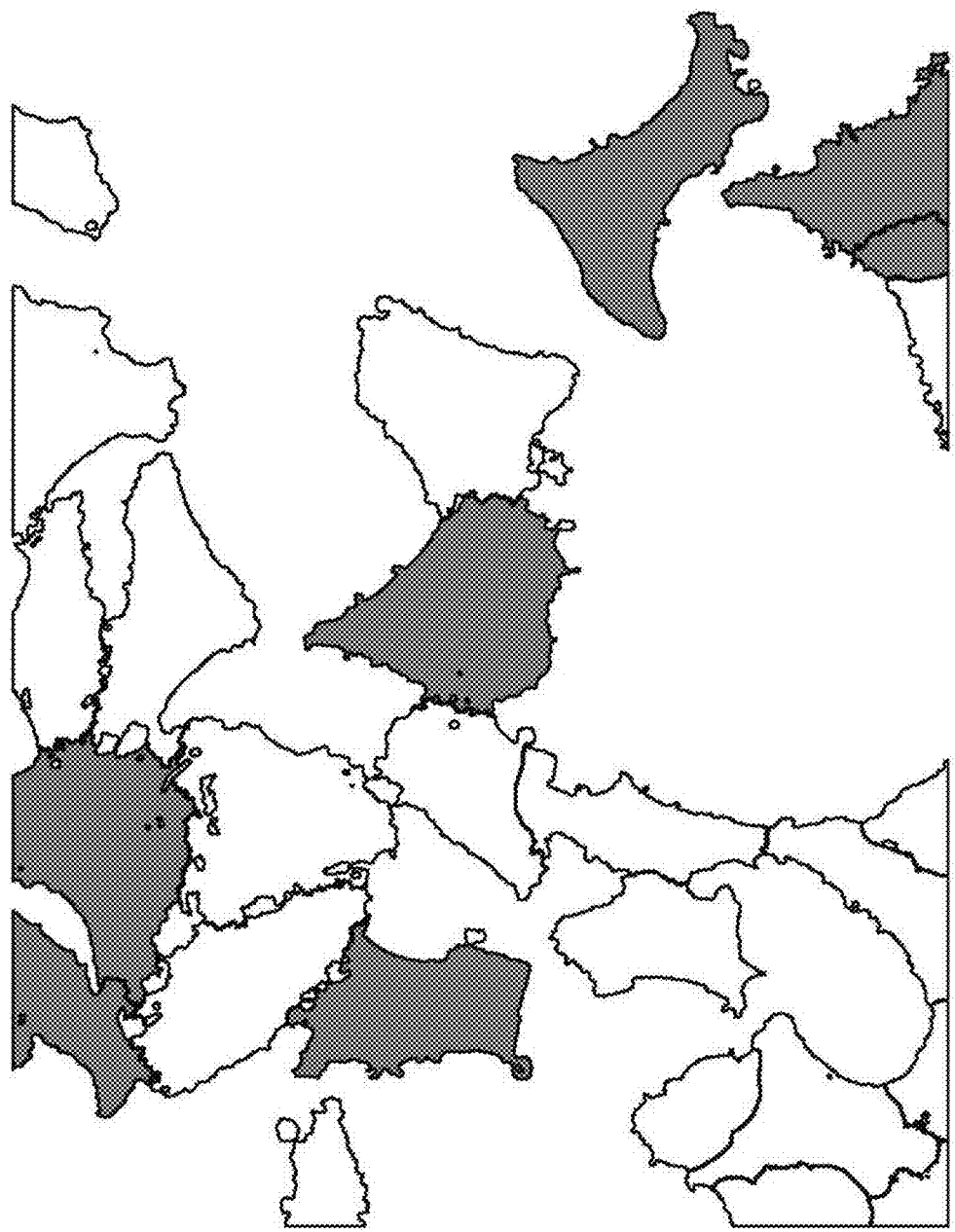
FIG. 18 is a diagram in which, in the image after segmentation, ROIs whose 1000×"average fluorescence intensity/average optical thickness" is 80 or more are illustrated in gray, and ROIs whose 1000×"average fluorescence intensity/average optical thickness" is 80 or less are illustrated in white.

FIG. 18 is a diagram in which, in the image after segmentation, ROIs whose 1000×"average fluorescence intensity/average optical thickness" is 80 or more are illustrated in gray, and ROIs whose 1000×"average fluorescence intensity/average optical thickness" is 80 or less are illustrated in white. As described above, an appropriate threshold value is set to compare the magnitude of the "average fluorescence intensity/average optical thickness" of each ROI with the threshold value, and thus, it can be highly accurately determined whether the ROI is a positive cell or a negative cell.

In addition to the cells that are individually separated from each other, when a cell population that is an aggregate of a plurality of cells is set as a ROI, the fluorescence measurement apparatus and the fluorescence measurement method of the present embodiment can accurately determine the fluorescence expression rate of the cell population based on the "average fluorescence intensity/average optical thickness" of the ROI. The cell population is the aggregation of a plurality of cells in a colony form or a spheroid form. The term "colony" typically means that a plurality of cells spatially forms a group together. The term "spheroid" typically means a cell population that cells are piled up in a thickness of 100 μm or more in a spherical shape. One spheroid typically includes 1000 to several tens of thousands of cells.

Figure 19:
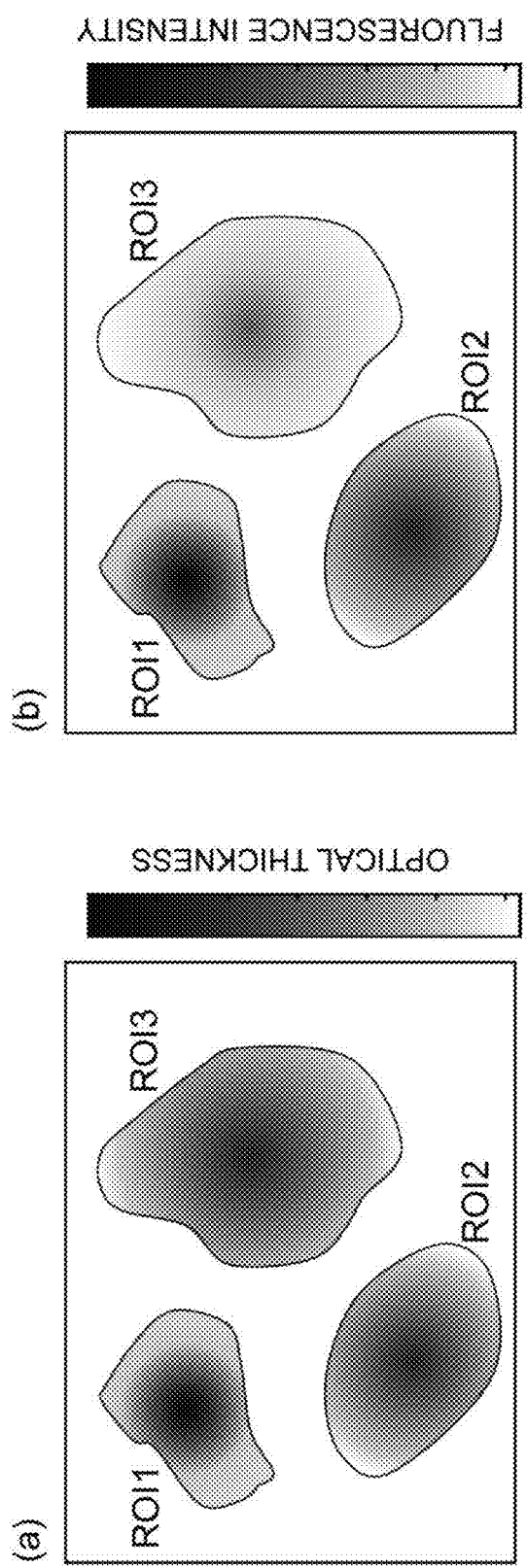
FIG. 19 includes diagrams schematically showing an optical thickness image and a fluorescence image for a cell population, and shows (a) an optical thickness image, and (b) a fluorescence image.
Figure 20:
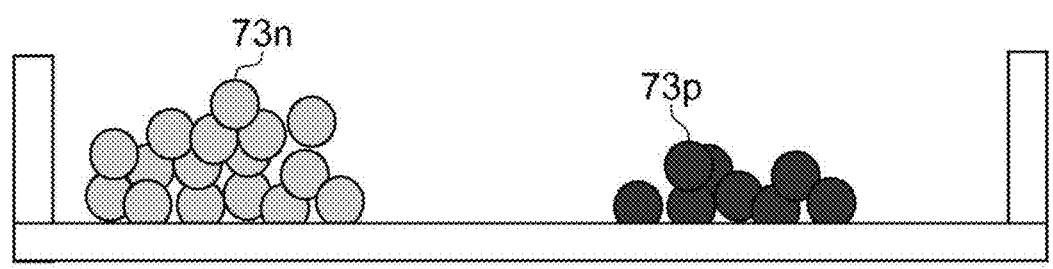
FIG. 20 is a diagram schematically illustrating a cell population containing only positive cells 73p and a cell population containing only negative cells 73n.

Even when the cells are piled up in the cell population, the optical thickness image ((a) in FIG. 19) and the fluorescence image ((b) in FIG. 19) are acquired for the same field of view, and in these images, ROI1 to ROI3 are set for the regions of the cell populations. Further, the fluorescence expression rate is determined based on the "average fluorescence intensity/average optical thickness" in each ROI, and thus, it can be determined whether the cells contained in the cell population in each ROI are the positive cells $73p$ or the negative cells $73n$ (FIG. 20), and further, a mixing ratio of the positive cells and the negative cells in the cell population in each ROI can be evaluated.

In addition, in the object having a thickness as the cell population in a spheroid form, in some cases, the fluorescence intensity is not proportional to the thickness due to the attenuation of the excitation light or the fluorescence in the object. In such a case, preferably, the fluorescence intensity is corrected by the thickness.

Further, when the ROI is set such that all the cells in the container are included, the fluorescence measurement apparatus and the fluorescence measurement method of the present embodiment can accurately determine the fluorescence expression rate of the entire cells in the container based on the "average fluorescence intensity/average optical thickness" in the ROI. For example, when individual wells of a multiwell plate are set to ROIs, regardless of the number of cells present in each well, the fluorescence expression rate is determined based on the "average fluorescence intensity/average optical thickness" in each ROI, and thus, it can be determined whether cells in the ROI are the positive cells or the negative cells, and further, a mixing ratio of the positive cells and the negative cells in each ROI can be evaluated. In addition, for acquiring the optical thickness image and the fluorescence image for a plurality of wells of the multiwell plate, tiling imaging is preferable.

Next, a method of evaluating the mixing ratio of the positive cell and the negative cell in the ROI will be described. In the present embodiment, even when positive cells and negative cells are mixed together for a desired reaction, including an antigen-antibody reaction, for example, the mixing ratio of the positive cell and the negative cell can be evaluated with no segmentation of the individual cells.

Even on the negative cell that presents no desired reaction, fluorescence to some extent sometimes observed due to the influence of autofluorescence or localization of specific fluorescent dye. Even when cells in the field of view are entirely negative cells, photons of fluorescence are observed due to the influence of autofluorescence or localization of non-specific fluorescent dye. Therefore, the mixing ratio of the positive cell and the negative cell is not necessarily proportional to the fluorescence intensity. However, in the present embodiment, the mixing ratio of the positive cell and the negative cell can be determined in the following manner.

Figure 21:
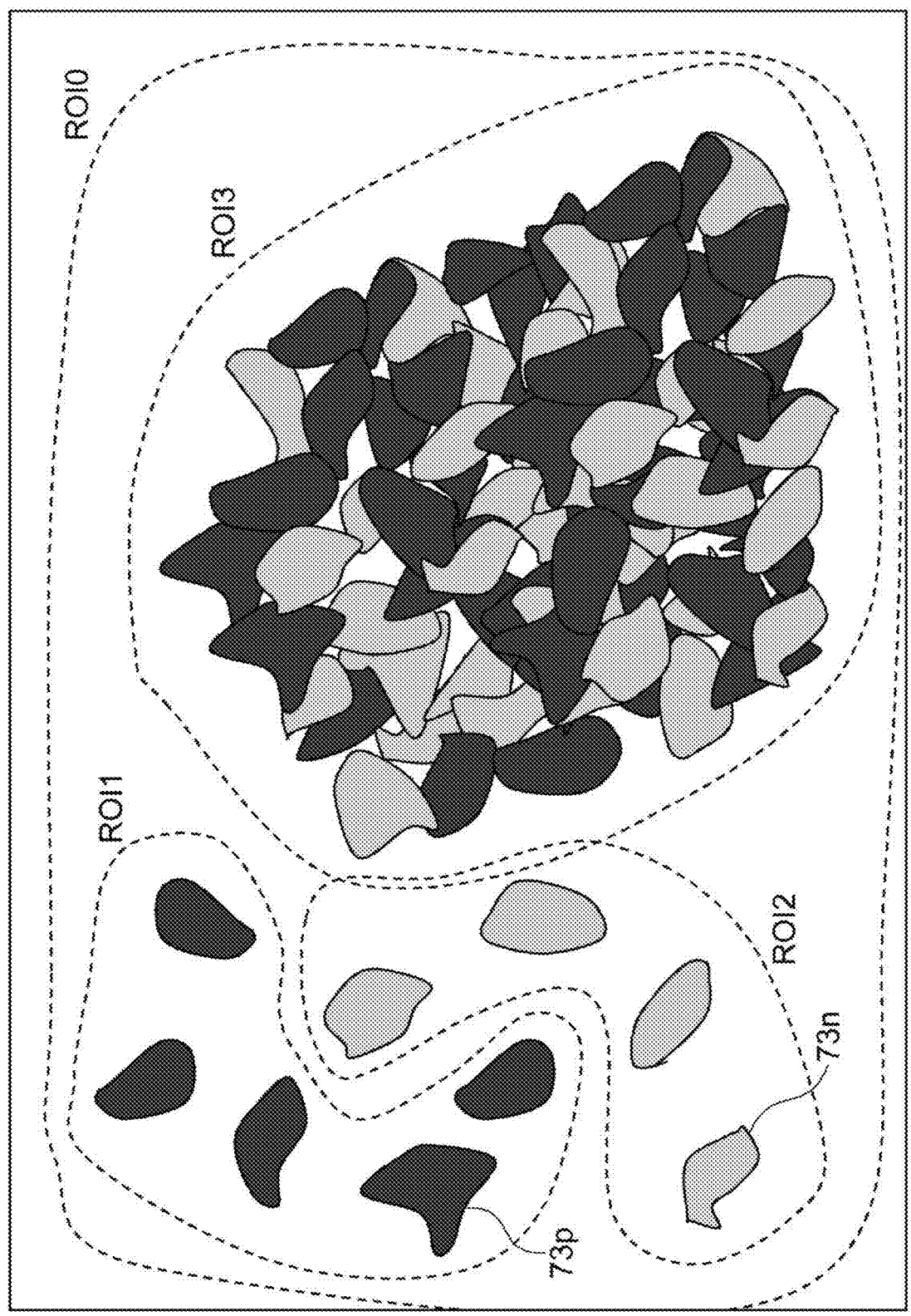
FIG. 21 is a diagram schematically showing an image of a field of view in which the positive cells and the negative cells are mixed together.

FIG. 21 is a diagram schematically showing an image of a field of view in which positive cells and negative cells are mixed together. In the drawing, a positive cell is shown by a gray region, and a negative cell is shown by a white region. The positive cells and the negative cells may be individually separated from each other, or may be piled up. In the example illustrated in the drawing, in the ROI1, only the positive cells $73p$ are present. In the ROI2, only the negative cells $73n$ are present. In the ROI3, the positive cells and the negative cells are mixed together, and cells are piled up. In the ROM that includes all the ROI1 to ROI3, the positive cells and the negative cells are mixed together. For such a field of view, the optical thickness image and the fluorescence image are acquired. In addition, this field of view may be a combined field of view in which fields of view in a plurality of imaging regions are tiled and combined.

The first region of interest (ROI1) containing only first objects (positive cells) having the fluorescence expression rate at a first threshold value or more is set, and a value Rp is determined, the value Rp being a value obtained by dividing the integrated value of the fluorescence intensity in the ROI1 by the integrated value of the optical thickness (the following Formula (8)). Preferably, a plurality of positive cells are contained in the ROI1. Further, the second region of interest (ROI2) containing only second objects (negative cells) having the fluorescence expression rate at a second threshold value or less is set, and a value Rn is determined, the value Rn being a value obtained by dividing the integrated value of the fluorescence intensity in the ROI2 by the integrated value of the optical thickness (the following Formula (9)). Preferably, a plurality of negative cells are contained in the ROI2. In addition, even a clear negative cell group possibly has some non-zero value of Rn due to the influence of autofluorescence and the like, however, by a method shown below, the influence of autofluorescence and the like can be corrected, and no problem arises.

[Formula 8]

$$R_p = \frac{\sum_{ROI1} FL(x, y)}{\sum_{ROI1} OT(x, y)} \quad (8)$$

[Formula 9]

$$R_n = \frac{\sum_{ROI2} FL(x, y)}{\sum_{ROI2} OT(x, y)} \quad (9)$$

The region of interest (ROI0) being a measurement target is set, and a value Rmix is determined, the value Rmix being a value obtained by dividing the integrated value FLtotal of the fluorescence intensity in the ROI0 by the integrated value OTtotal of the optical thickness (the following Formula (10)). When the mixing ratio of the positive cell and the negative cell in the ROI0 is x:(1−x), the integrated value FLtotal of the fluorescence intensity in the ROI0 is expressed by the following Formula (11). From these formulas, x is expressed by the following Formula (12). As can be seen from the Formula (12), x has a linear relationship to Rmix. When all cells in the ROI0 are positive cells, Rmix=Rp, and x=1. When all cells in the ROI0 are negative cells, Rmix=Rn, and x=0.

[Formula 10]

$$R_{mix} = \frac{FL_{total}}{OT_{total}} = \frac{\sum_{ROI} FL(x, y)}{\sum_{ROI} OT(x, y)} \quad (10)$$

[Formula 11]

$$FL_{total} = OT_{total} \cdot x \cdot R_p + OT_{total} \cdot (1-x) \cdot R_n \quad (11)$$

[Formula 12]

$$x = \frac{R_{mix} - R_n}{R_p - R_n} \quad (12)$$

As described above, the mixing ratio of the positive cell and the negative cell in the region of interest (ROI0) being the measurement target is determined from Rp that expresses the "average fluorescence intensity/average optical thickness" in the ROI1 containing only the positive cells, Rn that expresses the "average fluorescence intensity/average optical thickness" in the ROI2 containing only the negative cells, and Rmix that expresses the "average fluorescence intensity/average optical thickness" in the ROI0.

Conventionally, in order to determine the mixing ratio in the sample with the positive cells and the negative cells mixed together, it is necessary to perform individual segmentation of cells, and errors in the segmentation process are large uncertain factors in a counting result. On the other hand, in the present embodiment, the mixing ratio can be estimated without individual segmentation of cells. Such an advantage is in particular useful in the estimation of the mixing ratio in the cell population in which the positive cells and the negative cells are mixed and aggregated as in the ROI0 (or the ROI3). This is because, in the cell population in which cells are aggregated as described above, cells are often vertically piled up with each other, and it is difficult to perform individual segmentation of cells.

In the present embodiment, in setting the region of interest for the cell population, it is not necessary to set the region so as to surround the cell population without excess or deficiency. This is because, in the present embodiment, the necessary value of Rmix is expressed by the Formula (10), and there is only a difference whether zero is added to both of the denominator and numerator in the Formula (10), even when the ROI is strictly set, or the ROI extends off from the actual cell population.

In the present embodiment, in the calculation of the mixing ratio, preferably, the "average fluorescence intensity/average optical thickness" per cell is clearly different between the positive cell and the negative cell. Therefore, it is not desirable to apply it to an experiment system in which the fluorescence intensity temporally changes in the process of a reaction. Conversely, the present embodiment is usefully applicable to a sample in which a cell group that emits autofluorescence and in which fluorescent dye is not expressed and a cell group in which fluorescent dye is expressed are mixed.

Further, in the present embodiment, in a case where the difference of the optical volume is not negligible between the positive cell and the negative cell, preferably, an optical volume being the integrated value of the optical thickness per positive cell and per negative cell is estimated in advance, and the following operation is performed. An optical volume average value OVp of the positive cell is expressed by the following Formula (13). An optical volume average value OVn of the negative cell is expressed by the following Formula (14).

[Formula 13]

$$OV_p = \frac{\sum_{ROI1} OT}{\text{Number of pixels in } ROI1} \quad (13)$$

[Formula 14]

$$OV_n = \frac{\sum_{ROI2} OT}{\text{Number of pixels in } ROI2} \quad (14)$$

When the number of cells contained in the ROI0 is n, the integrated value FLtotal of the fluorescence intensity in the ROI0 is expressed by the following Formula (15), as the sum of the fluorescence intensity integrated value by the positive cell and the fluorescence intensity integrated value by the negative cell. Further, the integrated value OTtotal of the optical thickness in the ROM is expressed by the following Formula (16) as the sum of the optical volume by the positive cell and the optical volume by the negative cell.

[Formula 15]

$$FL_{total} = n \cdot x \cdot OV_p R_p + n \cdot (1-x) \cdot OV_n R_n \quad (15)$$

[Formula 16]

$$OT_{total} = n \cdot x \cdot OV_p + n \cdot (1-x) \cdot OV_n \quad (16)$$

The ratio of the optical volume average value OVp of the positive cell and the optical volume average value OVn of the negative cell is set to α (the following Formula (17)). At this time, Rmix is expressed by the following Formula (18). From this Formula, x is expressed by the following Formula (19). Here, when α=1, the Formula (19) is matched with the Formula (12).

[Formula 17]

$$\alpha = \frac{OV_p}{OV_n} \quad (17)$$

[Formula 18]

$$R_{mix} = \frac{FL_{total}}{OT_{total}} = \frac{x \cdot OV_p R_p + (1-x) \cdot OV_n R_n}{x \cdot OV_p + (1-x) \cdot OV_n} = \frac{\alpha \cdot R_p \cdot x + R_n \cdot (1-x)}{\alpha \cdot x + (1-x)} \quad (18)$$

[Formula 19]

$$x = \frac{R_{mix} - R_n}{\alpha \cdot R_p - R_n + \alpha - 1} \quad (19)$$

Next, using flowcharts in FIG. 22 and FIG. 23, the operation of the fluorescence measurement apparatus of the present embodiment and the procedures of the fluorescence measurement method will be described.

Figure 22:
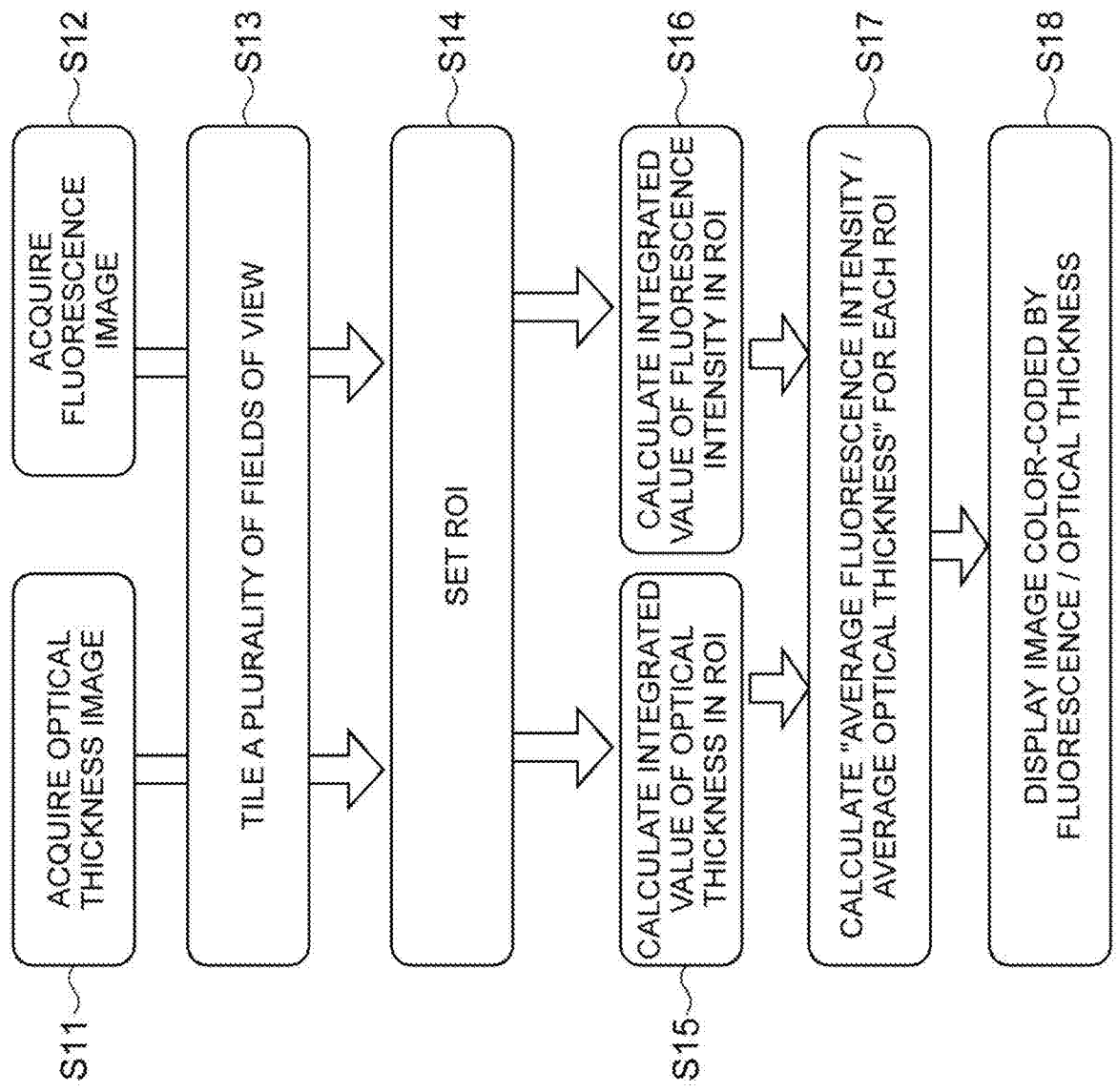
FIG. 22 is a flowchart illustrating procedures for determining whether it is the positive cell or the negative cell.

FIG. 22 is a flowchart illustrating procedures for determining whether it is the positive cell or the negative cell. In step S11, the optical thickness image is acquired based on the interference image acquired by the interference image acquisition unit. In step S12, the fluorescence image is acquired by the fluorescence image acquisition unit. In step S13, as necessary, a plurality of fields of view may be tiled in the optical thickness image and the fluorescence image.

In step S14, ROI is set. The setting of the ROI may be performed manually, or performed automatically by the operation unit 4. The shape of the ROI is an arbitrary shape. The ROI may be set to any of the entire field of view, each well in the multiwell plate, individual cells, and a cell population. In step S15, the optical thickness integrated value in each ROI is determined, and in step S16, the fluorescence intensity integrated value in each ROI is determined. In step S17, for each ROI, the "average fluorescence intensity/average optical thickness" is determined, and using this as the index of the fluorescence expression rate, it is determined whether the cell is the positive cell or the negative cell. Further, in step S18, for each ROI, the "average fluorescence intensity/average optical thickness" may be displayed as a numerical value, or an image color-coded by the "average fluorescence intensity/average optical thickness" may be displayed.

Figure 23:
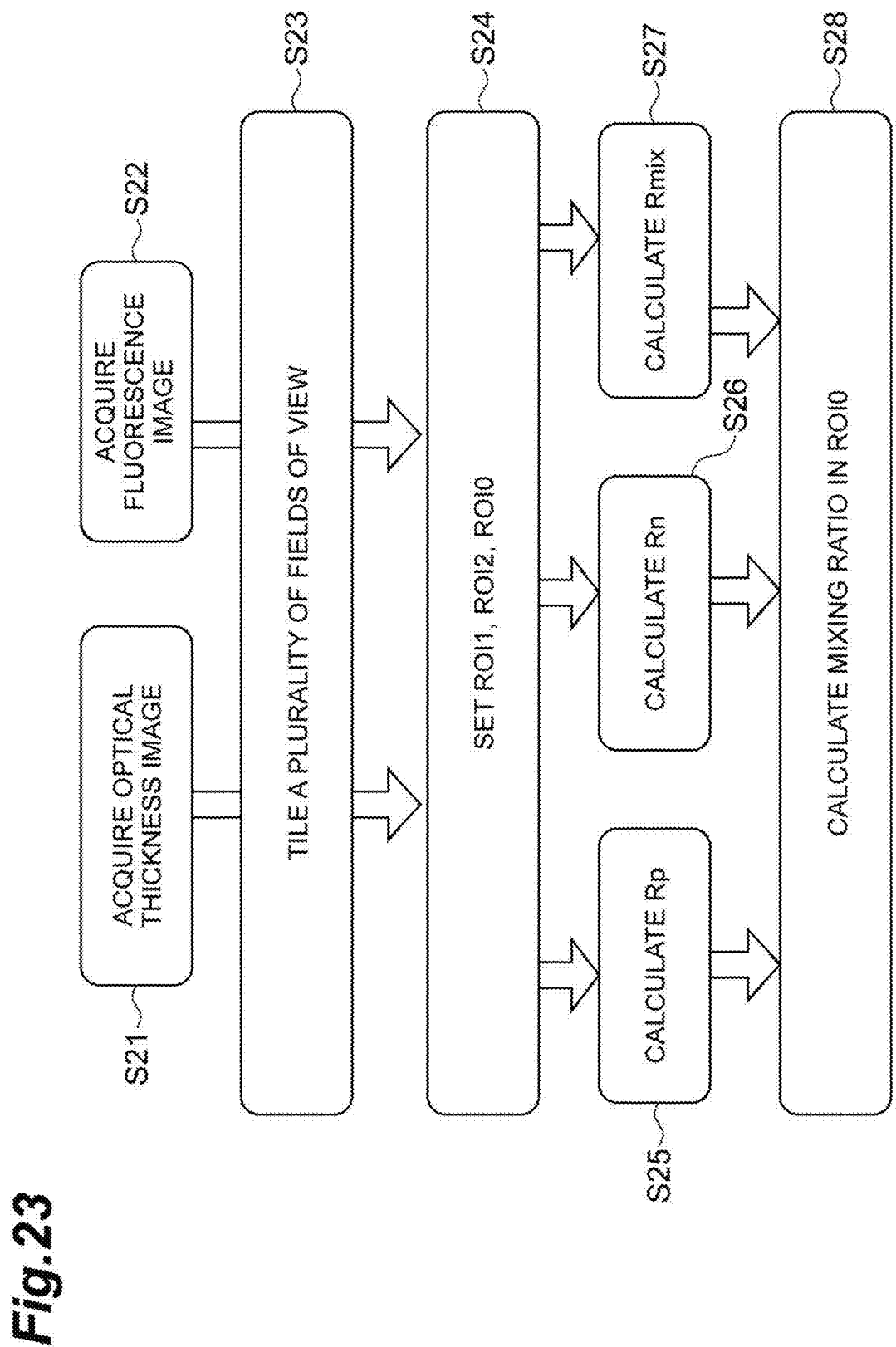
FIG. 23 is a flowchart illustrating procedures for evaluating a mixing ratio of the positive cell and the negative cell.

FIG. 23 is a flowchart illustrating procedures for evaluating the mixing ratio of the positive cell and the negative cell. In step S21, the optical thickness image is acquired based on the interference image acquired by the interference image acquisition unit. In step S22, the fluorescence image is acquired by the fluorescence image acquisition unit. In step S23, as necessary, a plurality of fields of view may be tiled in the optical thickness image and the fluorescence image.

In step S24, the ROI1 containing only the positive cells is set, and the ROI2 containing only the negative cells is set, and further, the region of interest (ROI0) being the measurement target is set. In step S25, Rp (Formula (8)) is calculated for the ROI1. In step S26, Rn (Formula (9)) is calculated for the ROI2. In step S27, Rmix (Formula (10)) is calculated for the ROI0. Further, in step S28, the mixing ratio x (Formula (12)) is calculated. The mixing ratio may be displayed as a numerical value, or an image may be displayed with pseudocolor corresponding to the mixing ratio.

Next, various modifications will be described. The present invention is not limited to the above embodiment, and can be modified variously.

Figure 24:
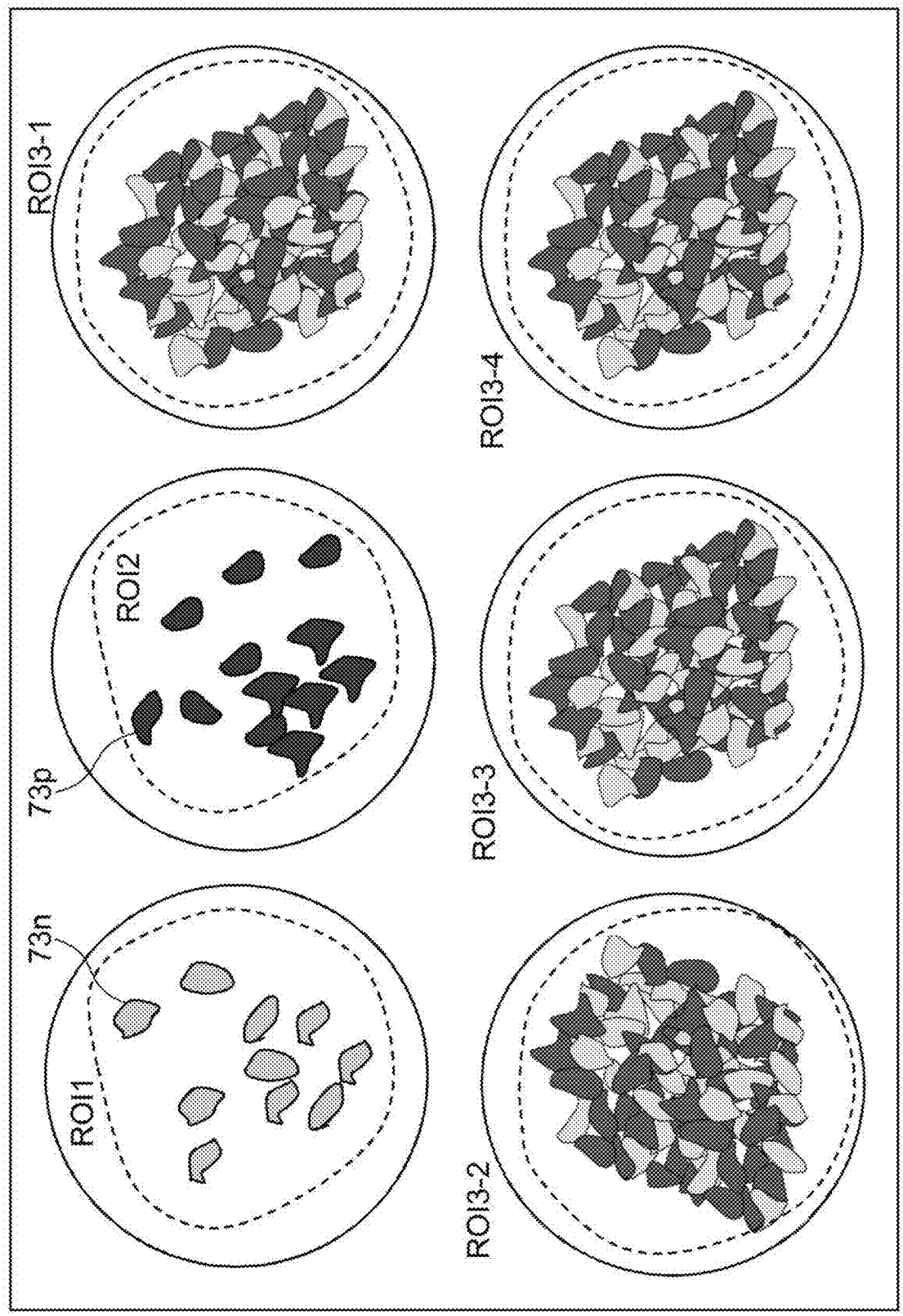
FIG. 24 is a diagram illustrating a ROI setting method of a first modification.

FIG. 24 is a diagram illustrating a ROI setting method of a first modification. In this example, cells are contained respectively in six wells of the multiwell plate, and the ROI is set for each well. In the well of the ROI1, only the negative cells 73n are contained. In the well of the ROI2, only the positive cells 73p are contained. In the wells of the ROI3-1 to 4 being measurement targets, both of the negative cells and the positive cells are contained. The mixing ratio of the negative cell and the positive cell may be determined respectively for the four ROI3-1 to 4, or may be determined for one ROI including the four ROI3-1 to 4.

Figure 25:
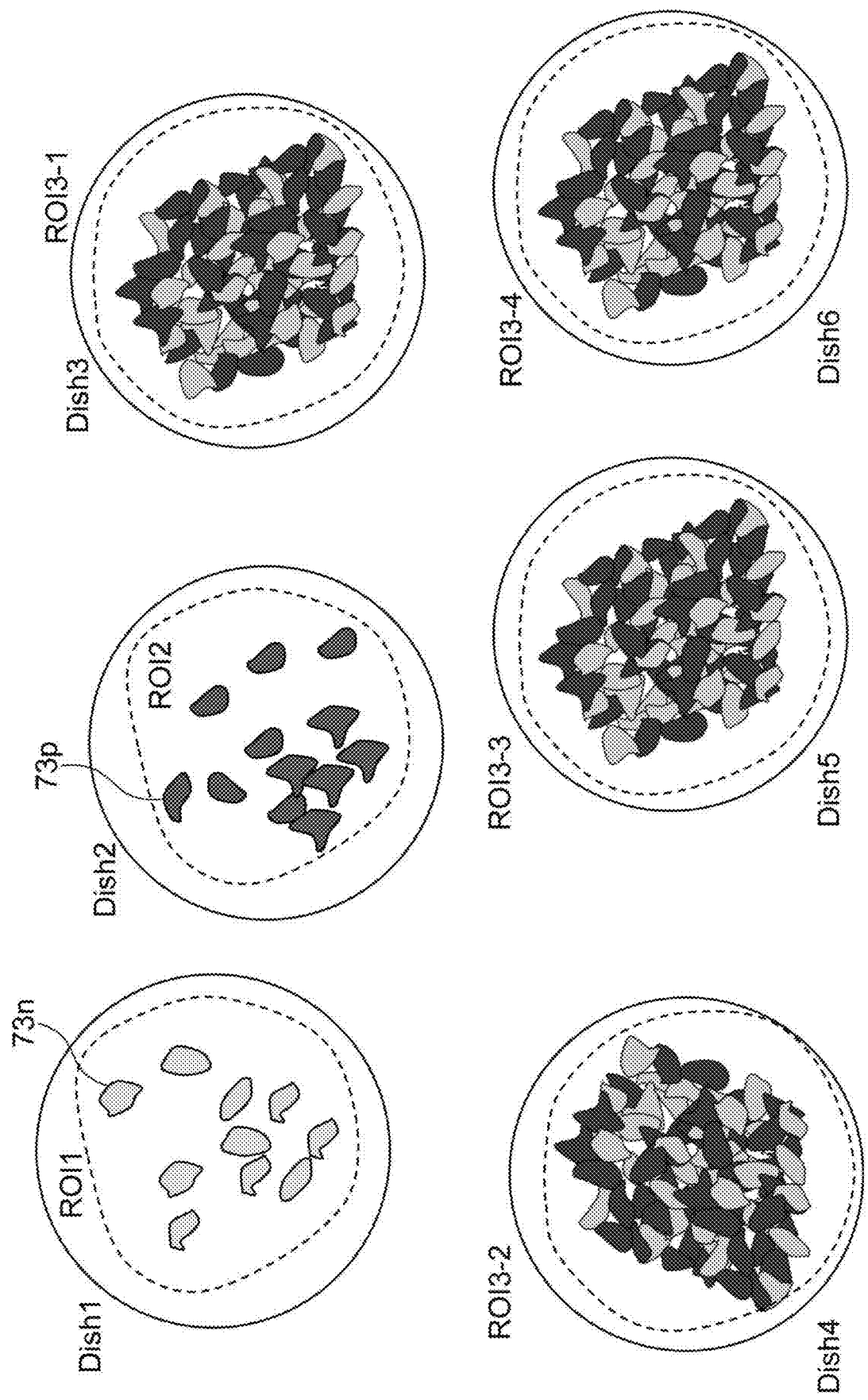
FIG. 25 is a diagram illustrating a ROI setting method of a second modification.

FIG. 25 is a diagram illustrating a ROI setting method of a second modification. In this example, cells are contained respectively in six containers (Dish1 to 6) independent from each other, and the ROI is set for each container. In the container (Dish1) of the ROI1, only the negative cells 73n are contained. In the container (Dish2) of the ROI2, only the positive cells 73p are contained. In the containers (Dish3 to 6) of the ROI3-1 to 4 being measurement targets, both of the negative cells and the positive cells are contained. Also in this example, the mixing ratio of the negative cell and the positive cell may be determined respectively for the four ROI3-1 to 4, or may be determined for one ROI including the four ROI3-1 to 4.

Figure 26:
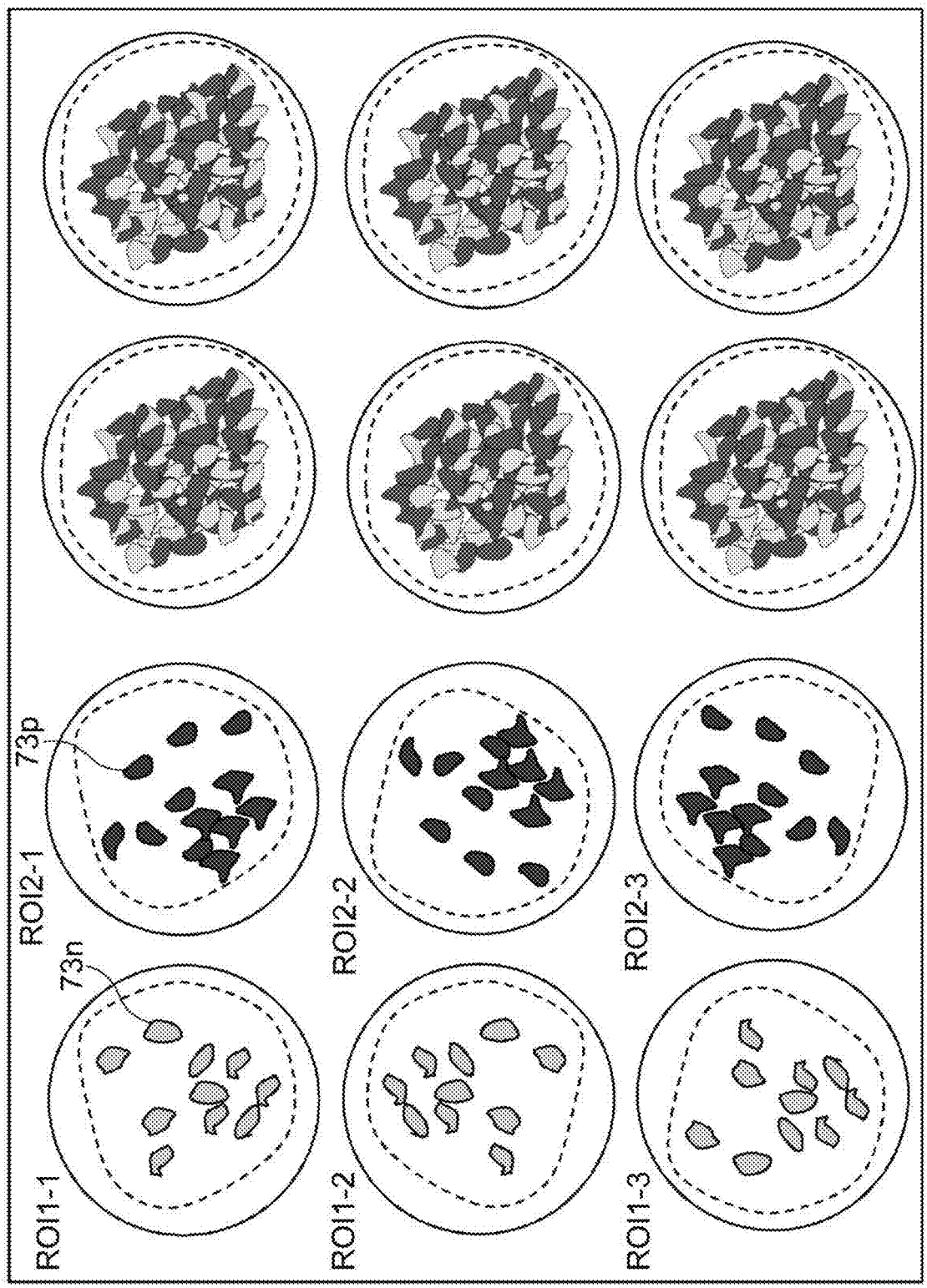
FIG. 26 is a diagram illustrating a ROI setting method of a third modification.

FIG. 26 is a diagram illustrating a ROI setting method of a third modification. In this example, cells are contained respectively in 12 wells of the multiwell plate, and the ROI is set for each well. In the wells of the three ROI1-1 to 3, only the negative cells 73n are contained, and Rn may be determined for one ROI including the ROI1-1 to 3. In the wells of the three ROI2-1 to 3, only the positive cells 73p are contained, and Rp may be determined for one ROI including the ROI2-1 to 3. In the wells of other six ROIs being measurement targets, both of the negative cells and the positive cells are contained. The mixing ratio of the negative cell and the positive cell may be determined respectively for the six ROIs, or may be determined for one ROI including the six ROIs.

The light source 11 that is used to acquire the interference image in the interference image acquisition unit may be a laser light source, however, the light source is desirably an incoherent light source. In a case where a laser light source is used as the light source 11, irregular speckle noise sometimes occurs in the background of the optical thickness image to be acquired due to high coherence of laser light, leading to a possible factor of errors in the optical thickness integrated value in the ROI. On the other hand, in a case where an incoherent light source is used as the light source 11, the occurrence of speckle noise is suppressed, and errors in the optical thickness integrated value in the ROI are small, and thus, it is preferable.

Further, the background fluorescence that is observed in a region where no cell is present in the first place is desirably zero as much as possible. In order to achieve such conditions, desirably, using information of the optical thickness image, a region whose optical thickness is almost zero in the optical thickness image is regarded as the background region of fluorescence in the fluorescence image, and background correction and shading correction are performed.

In regard to the correction of background fluorescence, instead of shading correction on the image, correction using the integrated value of the fluorescence intensity may be performed. In a case where the integrated value of the fluorescence intensity is used, a region of interest ROI0 where no cell is present is provided, the shape, area, and the conditions in imaging of the ROI0 are set to the same as those of the ROI1 to ROIn being measurement targets (in the ROI, only any one of the positive cell 73p and the negative cell 73n may be contained, or both cells may be mixed together), and then the integrated value of the fluorescence intensity in the ROI0 is determined in advance. Although the ROI0 contains no cell, desirably, the culture solution and a reagent are similarly added as the ROI of the measurement target. Under the above conditions, in regard to the integrated value of the fluorescence intensity in the ROI calculated for the ROI1 to ROIn of measurement targets, the integrated value of the fluorescence intensity in the ROI calculated for the ROI0 is subtracted as background fluorescence, and then the value is used for processing in the subsequent stage, and thus, this enables the correction of background fluorescence.

Further, in the determination of the integrated value of the fluorescence intensity in the ROI, in a case where the size of the ROI is substantially matched with the entire light receiving area of the imager 18 that is shared for the interference imaging and the fluorescence imaging or the imager 36 only for the fluorescence imaging, a configuration may be provided in which all the pixels of the imager 18 or the imager 36 are binned in advance in an analog manner or in a digital manner in performing the fluorescence imaging, the imager is used as a light receiving element being a single element substantially using the entire light receiving area as the light receiving plane, and the obtained value is set as the integrated value of the fluorescence intensity in the ROI. In this case, since background correction and shading correction based on the image are not enabled, desirably, background fluorescence correction is performed using the ROI0 as the ROI where no cell is present.

Further, in the determination of the integrated value of the fluorescence intensity in the ROI, in a case where the fluorescence image acquisition imager 36 is further included, which is provided on the fluorescence imaging plane separately from the interference image acquisition imager 18, as the fluorescence measurement apparatus 1C of the second modification illustrated in FIG. 6, the fluorescence image acquisition imager 36 may be replaced by a light receiving element being a single element. Desirably, the position and the size of the light receiving plane in the above single light receiving element are substantially matched with the position and the size of the ROI projected onto the fluorescence imaging plane. The light receiving element being a single element is, for example, a photodiode, an avalanche photodiode, a photomultiplier tube, or the like.

In substantially matching the position and the size of the light receiving plane of the light receiving element in the single element with the position and the size of the ROI projected onto the fluorescence imaging plane, a configuration may be provided in which a reducing optical system or an expanding optical system is provided between the sample plane and the fluorescence imaging plane, and the expanding ratio or the reducing ratio between the sample plane and the fluorescence imaging plane is appropriately adjusted. Further, in a case where the shape of the ROI and the shape of the light receiving plane in the single light receiving element are different from each other (for example, in a case where the ROI is in a circular shape and the light receiving plane of the light receiving element is in a rectangular shape), a configuration may be provided in which a mask having a physical light shielding portion is provided in front of the light receiving plane of the single light receiving element, and thus, the position and the size of the light receiving plane in the single light receiving element are substantially nearly matched with the position and the size of the ROI projected onto the fluorescence imaging plane.

The fluorescence measurement apparatus and the fluorescence measurement method are not limited to the embodiments and the configuration examples described above, and can be variously modified.

The fluorescence measurement apparatus of the above embodiment is configured to include (1) a fluorescence image acquisition unit for acquiring a fluorescence image containing an object, (2) an interference image acquisition unit for acquiring an interference image containing the object, and (3) an operation unit for determining an optical thickness image based on the interference image acquired by the interference image acquisition unit, and determining, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

In the above fluorescence measurement apparatus, the operation unit may determine a value obtained by dividing the integrated value of the fluorescence intensity in the region of interest by the integrated value of the optical thickness as an index of the fluorescence expression rate of the object in the region of interest.

In the above fluorescence measurement apparatus, the operation unit may determine a mixing ratio of a first object and a second object in the region of interest being a measurement target based on a value obtained by dividing the integrated value of the fluorescence intensity in a first region of interest containing only the first object having the fluorescence expression rate at a first threshold value or more by the integrated value of the optical thickness, a value obtained by dividing the integrated value of the fluorescence intensity in a second region of interest containing only the second object having the fluorescence expression rate at a second threshold value or less by the integrated value of the optical thickness, and a value obtained by dividing the integrated value of the fluorescence intensity in the region of interest being the measurement target by the integrated value of the optical thickness.

In the above fluorescence measurement apparatus, the operation unit may set the region of interest based on the optical thickness image.

In the above fluorescence measurement apparatus, the operation unit may perform background correction and shading correction on the fluorescence image using information of the optical thickness image, and may determine the integrated value of the fluorescence intensity in the fluorescence image after correction.

In the above fluorescence measurement apparatus, the interference image acquisition unit may acquire the interference image using incoherent light.

The above fluorescence measurement apparatus may have a configuration in which at least parts of optical systems of the interference image acquisition unit and the fluorescence image acquisition unit are configured in common.

In the above fluorescence measurement apparatus, the fluorescence image acquisition unit may acquire the fluorescence image containing an aggregate of objects, the interference image acquisition unit may acquire the interference image containing the aggregate, and the operation unit may determine the fluorescence expression rate of the aggregate based on the integrated value of the fluorescence intensity of the aggregate in the fluorescence image acquired by the fluorescence image acquisition unit and the integrated value of the optical thickness of the aggregate in the optical thickness image determined from the interference image acquired by the interference image acquisition unit.

The fluorescence measurement method of the above embodiment is configured to include (1) a fluorescence image acquisition step of acquiring a fluorescence image containing an object by a fluorescence image acquisition unit, (2) an interference image acquisition step of acquiring an interference image containing the object by an interference image acquisition unit, and (3) an operation step of determining an optical thickness image based on the interference image acquired by the interference image acquisition unit, and determining, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

In the above fluorescence measurement method, in the operation step, a value obtained by dividing the integrated value of the fluorescence intensity in the region of interest by the integrated value of the optical thickness may be determined as an index of the fluorescence expression rate of the object in the region of interest.

In the above fluorescence measurement method, in the operation step, a mixing ratio of a first object and a second object in the region of interest being a measurement target may be determined based on a value obtained by dividing the integrated value of the fluorescence intensity in a first region of interest containing only the first object having the fluorescence expression rate at a first threshold value or more by the integrated value of the optical thickness, a value obtained by dividing the integrated value of the fluorescence intensity in a second region of interest containing only the second object having the fluorescence expression rate at a second threshold value or less by the integrated value of the optical thickness, and a value obtained by dividing the integrated value of the fluorescence intensity in the region of interest being the measurement target by the integrated value of the optical thickness.

In the above fluorescence measurement method, in the operation step, the region of interest may be set based on the optical thickness image.

In the above fluorescence measurement method, in the operation step, background correction and shading correction may be performed on the fluorescence image using information of the optical thickness image, and the integrated value of the fluorescence intensity in the fluorescence image after correction may be determined.

In the above fluorescence measurement method, in the interference image acquisition step, the interference image acquisition unit may acquire the interference image using incoherent light.

The above fluorescence measurement method may have a configuration in which at least parts of optical systems of the interference image acquisition unit and the fluorescence image acquisition unit are configured in common.

In the above fluorescence measurement method, in the fluorescence image acquisition step, the fluorescence image containing an aggregate of objects may be acquired by the fluorescence image acquisition unit, in the interference image acquisition step, the interference image containing the aggregate may be acquired by the interference image acquisition unit, and in the operation step, the fluorescence expression rate of the aggregate may be determined based on the integrated value of the fluorescence intensity of the aggregate in the fluorescence image acquired by the fluorescence image acquisition unit and the integrated value of the optical thickness of the aggregate in the optical thickness image determined from the interference image acquired by the interference image acquisition unit.

In the above fluorescence measurement method, the object may be a cell.

In the above fluorescence measurement method, in the fluorescence image acquisition step, a multiwell plate having wells each containing a cell as the object may be subjected to tiling imaging by the fluorescence image acquisition unit to acquire the fluorescence image, in the interference image acquisition step, the multiwell plate may be subjected to tiling imaging by the interference image acquisition unit to acquire the interference image, and in the operation step, in the fluorescence image and the optical thickness image, the region of interest may be set for each well of the multiwell plate.

INDUSTRIAL APPLICABILITY

The embodiments may be used as a fluorescence measurement apparatus and a fluorescence measurement method that can accurately determine a fluorescence expression rate of an object in a region of interest.

REFERENCE SIGNS LIST 1A-1D—fluorescence measurement apparatus, 2—interference image acquisition unit, 3—fluorescence image acquisition unit, 4—operation unit, 5—timing control circuit, 11—light source, 12—beam splitter, 13, 14—objective lens, 15—reference mirror, 16—tube lens, 17—beam splitter, 18—imager, 21—piezoelectric element, 22—photodetector, 23—phase control circuit, 31—excitation light source, 32—beam splitter, 33—excitation light cut filter, 34—dichroic mirror, 35—fluorescence transmission filter, 36—imager, 41—mirror, 42—beam splitter, 70—container, 71—reflection enhancing coating, 72—culture solution, 73—cell.

The invention claimed is:

1. A fluorescence measurement apparatus comprising:
   a fluorescence image acquisition unit configured to acquire a fluorescence image containing an object;
   an interference image acquisition unit configured to acquire an interference image containing the object; and
   an operation unit configured to determine an optical thickness image based on the interference image acquired by the interference image acquisition unit, and determine, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

2. The fluorescence measurement apparatus according to claim 1, wherein the operation unit is configured to determine a value obtained by dividing the integrated value of the fluorescence intensity in the region of interest by the integrated value of the optical thickness as an index of the fluorescence expression rate of the object in the region of interest.

3. The fluorescence measurement apparatus according to claim 2, wherein the operation unit is configured to determine a mixing ratio of a first object and a second object in the region of interest being a measurement target based on a value obtained by dividing the integrated value of the fluorescence intensity in a first region of interest containing only the first object having the fluorescence expression rate at a first threshold value or more by the integrated value of the optical thickness, a value obtained by dividing the integrated value of the fluorescence intensity in a second region of interest containing only the second object having the fluorescence expression rate at a second threshold value or less by the integrated value of the optical thickness, and a value obtained by dividing the integrated value of the fluorescence intensity in the region of interest being the measurement target by the integrated value of the optical thickness.

4. The fluorescence measurement apparatus according to claim 1, wherein the operation unit is configured to set the region of interest based on the optical thickness image.

5. The fluorescence measurement apparatus according to claim 1, wherein the operation unit is configured to perform background correction and shading correction on the fluorescence image using information of the optical thickness image, and determine the integrated value of the fluorescence intensity in the fluorescence image after correction.

6. The fluorescence measurement apparatus according to claim 1, wherein the interference image acquisition unit is configured to acquire the interference image using incoherent light.

7. The fluorescence measurement apparatus according to claim 1, wherein at least parts of optical systems of the interference image acquisition unit and the fluorescence image acquisition unit are configured in common.

8. The fluorescence measurement apparatus according to claim 1, wherein
the fluorescence image acquisition unit is configured to acquire the fluorescence image containing an aggregate of objects,
the interference image acquisition unit is configured to acquire the interference image containing the aggregate, and
the operation unit is configured to determine the fluorescence expression rate of the aggregate based on the integrated value of the fluorescence intensity of the aggregate in the fluorescence image acquired by the fluorescence image acquisition unit and the integrated value of the optical thickness of the aggregate in the optical thickness image determined from the interference image acquired by the interference image acquisition unit.

9. A fluorescence measurement method comprising:
acquiring a fluorescence image containing an object by a fluorescence image acquisition unit;
acquiring an interference image containing the object by an interference image acquisition unit; and
determining an optical thickness image based on the interference image acquired by the interference image acquisition unit, and determining, in a region of interest set in common in both of the fluorescence image acquired by the fluorescence image acquisition unit and the optical thickness image, a fluorescence expression rate of the object based on an integrated value of a fluorescence intensity in the fluorescence image and an integrated value of an optical thickness in the optical thickness image.

10. The fluorescence measurement method according to claim 9, wherein, a value obtained by dividing the integrated value of the fluorescence intensity in the region of interest by the integrated value of the optical thickness is determined as an index of the fluorescence expression rate of the object in the region of interest.

11. The fluorescence measurement method according to claim 10, wherein, a mixing ratio of a first object and a second object in the region of interest being a measurement target is determined based on a value obtained by dividing the integrated value of the fluorescence intensity in a first region of interest containing only the first object having the fluorescence expression rate at a first threshold value or more by the integrated value of the optical thickness, a value obtained by dividing the integrated value of the fluorescence intensity in a second region of interest containing only the second object having the fluorescence expression rate at a second threshold value or less by the integrated value of the optical thickness, and a value obtained by dividing the integrated value of the fluorescence intensity in the region of interest being the measurement target by the integrated value of the optical thickness.

12. The fluorescence measurement method according to claim 9, wherein, the region of interest is set based on the optical thickness image.

13. The fluorescence measurement method according to claim 9, wherein, background correction and shading correction are performed on the fluorescence image using information of the optical thickness image, and the integrated value of the fluorescence intensity in the fluorescence image after correction is determined.

14. The fluorescence measurement method according to claim 9, wherein in acquiring the interference image, the interference image acquisition unit acquires the interference image using incoherent light.

15. The fluorescence measurement method according to claim 9, wherein at least parts of optical systems of the interference image acquisition unit and the fluorescence image acquisition unit are configured in common.

16. The fluorescence measurement method according to claim 9, wherein
in acquiring the fluorescence image, the fluorescence image containing an aggregate of objects is acquired by the fluorescence image acquisition unit,
in acquiring the interference image, the interference image containing the aggregate is acquired by the interference image acquisition unit, and
the fluorescence expression rate of the aggregate is determined based on the integrated value of the fluorescence intensity of the aggregate in the fluorescence image acquired by the fluorescence image acquisition unit and the integrated value of the optical thickness of the aggregate in the optical thickness image determined from the interference image acquired by the interference image acquisition unit.

17. The fluorescence measurement method according to claim 9, wherein the object is a cell.

18. The fluorescence measurement method according to claim 17, wherein
in acquiring the fluorescence image, a multiwell plate having wells each containing a cell as the object is subjected to tiling imaging by the fluorescence image acquisition unit to acquire the fluorescence image, in acquiring the interference image, the multiwell plate is subjected to tiling imaging by the interference image acquisition unit to acquire the interference image, and in the fluorescence image and the optical thickness image, the region of interest is set for each well of the multiwell plate.

\* \* \* \* \*